(12) United States Patent
Chen

(10) Patent No.: US 12,289,734 B2
(45) Date of Patent: Apr. 29, 2025

(54) WIRELESS COMMUNICATION METHOD FOR DATA TRANSMISSION IN INACTIVE STATE AND RELATED DEVICES

(71) Applicant: PURPLEVINE INNOVATION COMPANY LIMITED, Hong Kong (CN)

(72) Inventor: Chiu-Wen Chen, Hong Kong (CN)

(73) Assignee: PURPLEVINE INNOVATION COMPANY LIMITED, Hong Kong (CN)

( * ) Notice: Subject to any disclaimer, the term of this patent is extended or adjusted under 35 U.S.C. 154(b) by 116 days.

(21) Appl. No.: 17/641,169

(22) PCT Filed: Aug. 4, 2021

(86) PCT No.: PCT/CN2021/110508
§ 371 (c)(1),
(2) Date: Mar. 8, 2022

(87) PCT Pub. No.: WO2022/028461
PCT Pub. Date: Feb. 10, 2022

(65) Prior Publication Data
US 2022/0346135 A1  Oct. 27, 2022

Related U.S. Application Data

(60) Provisional application No. 63/061,228, filed on Aug. 5, 2020.

(51) Int. Cl.
*H04W 72/23* (2023.01)
*H04W 72/566* (2023.01)
*H04W 74/0833* (2024.01)

(52) U.S. Cl.
CPC ......... *H04W 72/23* (2023.01); *H04W 72/569* (2023.01); *H04W 74/0833* (2013.01)

(58) Field of Classification Search
CPC .............. H04W 72/23; H04W 72/569; H04W 74/0833; H04W 72/56; H04W 68/00; H04W 76/19; H04W 76/27; Y02D 30/70
(Continued)

(56) References Cited

U.S. PATENT DOCUMENTS 10,701,702 B2  6/2020  Shih et al.
11,856,642 B2 * 12/2023  Lee ........................... H04L 1/08
(Continued)

FOREIGN PATENT DOCUMENTS

| CN | 110139365 A | 8/2019 |
| CN | 111132345 A | 5/2020 |
| CN | 111328151 A | 6/2020 |

OTHER PUBLICATIONS

International Search Report and the Written Opinion Dated Nov. 3, 2021 From the International Searching Authority Re. Application No. PCT/CN2021/110508.
(Continued)

*Primary Examiner* — Rownak Islam
(74) *Attorney, Agent, or Firm* — Rivka Friedman

(57) ABSTRACT

An apparatus and a method of wireless communication are provided. The method by a user equipment (UE) includes being configured by a base station with uplink (UL) grant resources for the UE to perform UL data transmission in an inactive state based on the configured UL grant resources; and performing the UL data transmission on the configured UL grant resources in the inactive state based on traffic characteristic of the UL data transmission and at least one transmission threshold. This can solve issues in the prior art, improve an issue of increasing in power consumption and signalling overhead, provide a good communication performance, and/or provide high reliability.

40 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0394698 | A1* | 12/2019 | Jeong | H04W 76/27 |
| 2020/0037345 | A1 | 1/2020 | Ryoo et al. | |
| 2020/0107369 | A1 | 4/2020 | Jeon et al. | |
| 2021/0092725 | A1* | 3/2021 | Park | H04W 8/08 |
| 2021/0219346 | A1* | 7/2021 | Agiwal | H04W 74/0833 |
| 2021/0400567 | A1* | 12/2021 | Sha | H04W 48/12 |
| 2022/0287102 | A1* | 9/2022 | Futaki | H04W 76/27 |
| 2023/0033841 | A1* | 2/2023 | Yi | H04W 74/004 |
| 2023/0164773 | A1* | 5/2023 | Alfarhan | H04W 72/52 |
| | | | | 370/329 |
| 2023/0239929 | A1* | 7/2023 | Lin | H04W 52/242 |
| | | | | 370/329 |
| 2023/0379815 | A1* | 11/2023 | Wang | H04W 48/20 |

OTHER PUBLICATIONS

Samsung, "R2-1701529: Data transfer in inactive state based on 4-step RACH procedures", 3GPP TSG-RAN WG2 #97, Feb. 17, 2017 (Feb. 17, 2017).

* cited by examiner

WIRELESS COMMUNICATION METHOD FOR DATA TRANSMISSION IN INACTIVE STATE AND RELATED DEVICES

CROSS-REFERENCE TO RELATED APPLICATION

This application claims the benefit of International Application No. PCT/CN2021/110508 filed on Aug. 4, 2021, which claims the priority to a U.S. Provisional Application No. 63/061,228 filed on Aug. 5, 2020. The entire disclosures of above applications are incorporated herein by reference.

BACKGROUND OF THE DISCLOSURE

1. Field of the Disclosure

The present disclosure relates to wireless communication technologies, and more particularly, to a wireless communication method and related devices for data transmission in inactive state.

2. Description of the Related Art

Communication systems and networks have developed towards being a broadband and mobile system. In cellular wireless communication systems developed by the Third Generation Partnership Project (3GPP), user equipment (UE) is connected by a wireless link to a radio access network (RAN). The RAN includes a set of base stations (BSs) which provide wireless links to the UEs located in cells covered by the base station, and an interface to a core network (CN) which provides overall network control. As will be appreciated the RAN and CN each conduct respective functions in relation to the overall network. The 3GPP has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, evolved from LTE, the so-called 5G or New radio (NR) systems where one or more cells are supported by a base station known as a gNB.

In LTE, the network may order the UE to get into an RRC_IDLE state if the UE has no activity for a while. This is done to reduce UE's power consumption. The UE needs to transit from the RRC_IDLE state to an RRC_CONNECTED state whenever the UE needs to perform some activity. Since small amounts of data have to be sent very frequently in current mobile communication applications, frequent Idle-Connected-Idle transitions increase network signaling load and latency. Therefore, 5G NR has defined a new state called RRC_INACTIVE to reduce network signaling load and latency involved in transiting to RRC_CONNECTED state. In NR, a UE is in RRC_CONNECTED when an RRC connection has been established or in RRC_INACTIVE when the RRC connection is suspended. If this is not the case, the UE is in RRC_IDLE state, that is, no RRC connection is established.

More specifically, in RRC_INACTIVE state, the UE Access Stratum (AS) context is stored at both UE and network sides so that the core network connection is maintained (i.e., the UE keeps in CM (abbreviated from Connection Management)-CONNECTED) and the radio access network (RAN) connection is released. The network can reach the inactive UE through RAN or CN Paging messages. The inactive UE cannot transmit any uplink (UL) data except for preamble as part of random access (RA) procedure initiated when the UE needs to transit to RRC_CONNECTED state for UL data transmission.

Currently, RRC_INACTIVE state does not support data transmission. Hence, the inactive UE has to resume the connection (i.e., transit to RRC_CONNECTED state) for any DL (abbreviated from downlink)/UL data. However, connection resuming and subsequently releasing back to RRC_INACTIVE state happens for each data transmission of the small and infrequent data packets. This results in unnecessary power consumption and signaling overhead.

SUMMARY

An object of the present disclosure is to propose an apparatus (such as a user equipment (UE) and/or a base station) and a method of wireless communication, which can solve issues in the prior art, improve an issue of increasing in power consumption and signaling overhead, provide a good communication performance, and/or provide high reliability.

In a first aspect of the present disclosure, a method of wireless communication by a user equipment (UE), including being configured by a base station with uplink (UL) grant resources for the UE to perform UL data transmission in an inactive state based on the configured UL grant resources; and performing the UL data transmission on the configured UL grant resources in the inactive state based on traffic characteristic of the UL data transmission and at least one transmission threshold.

In a second aspect of the present disclosure, a method of wireless communication by a base station including configuring a UE with uplink (UL) grant resources for the UE to perform UL data transmission in an inactive state based on the configured UL grant resources; and receiving, from the UE, the UL data transmission performed on the configured UL grant resources in the inactive state based on traffic characteristic of the UL data transmission and at least one transmission threshold.

In a third aspect of the present disclosure, a user equipment includes a memory, a transceiver and a processor coupled to the memory and the transceiver, the processor configured to call and run program instructions stored in a memory, to execute the wireless communication method.

In a fourth aspect of the present disclosure, a base station includes a memory, a transceiver and a processor coupled to the memory and the transceiver, the processor configured to call and run program instructions stored in a memory, to execute the wireless communication method.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF THE EMBODIMENTS

Figure 1A:
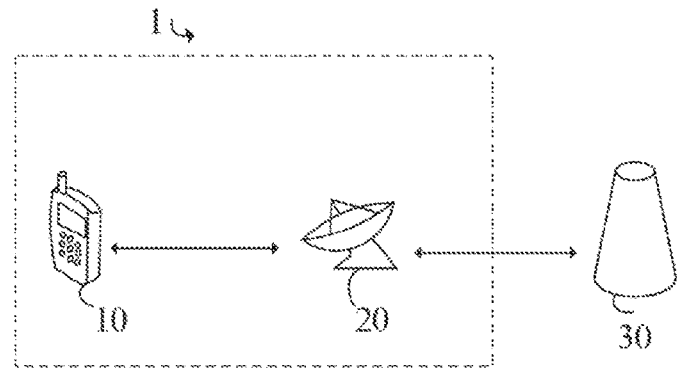
FIG. 1A is a block diagram illustrating a communication controlling system according to an embodiment of the present disclosure.

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The following table includes some abbreviations, which may be used in some contents of the present disclosure:

| Abbreviation | Full name |
| --- | --- |
| AMF | Access and Mobility Management Function |
| BS | Base station |
| CBRA | Contention-based random access |
| CFRA | Contention-free random access |
| CG | Configured grant |
| HRNN | Human-readable network name |
| NPN | Non-public network |
| NR | New Radio |
| PCG | Pre-configured grant |
| PRACH | Physical random access channel |
| RA | Random access |
| RAN | Radio access network |
| RNA | RAN Notification Area |
| SI | System Information |
| SMF | Session Management Function |
| SNPN | Standalone Non-Public Network |
| UE | User equipment |
| UPF | User Plane Function |
| BWP | Bandwidth Part |
| CN | Core network |
| DL | Downlink |
| NID | Network identifier |
| PDU | Physical data unit |
| PLMN | Public land mobile network |
| PUSCH | Physical uplink shared channel |
| RACH | Random access channel |
| RBPCG | RNA-based PCG |
| RRC | Radio resource control |
| UL | Uplink |
| URLLC | Ultra-reliable and low-latency communications |
| I-RNTI | Inactive-Radio Network Temporary Identifier |
| C-RNTI | Cell-Radio Network Temporary Identifier |
| TC-RNTI | Temporary Cell-Radio Network Temporary Identifier |
| S-TMSI | SAE-Temporary Mobile Subscriber Identity |
| SAE | System Architecture Evolution |
| RSRP | Reference signal received power |
| SDT | Small data transmission |

In this document, the term "I" should be interpreted to indicate "and/or."

An "inactive" UL grant for the inactive UE is proposed in this invention. The inactive UE can transmit small data on the inactive UL grant resource. With mobility consideration, the inactive UL grant resource can be a cell-based, RAN Notification Area based (RNA-based), contention-free based, or contention-based resource. The configuration of inactive UL grant can be obtained by RRC signaling. The activation of the "inactive" UL grant resources of the target cell/RNA can be performed by one-way indication or two-way request scheme.

In embodiments of the present disclosure, there are two types of low latency UL small data transmission (SDT) procedures in RRC_INACTIVE state as follows:
 Transmission on pre-configured grant (PCG) resources
 Contention-free/contention-based random access (CFRA/CBRA) procedure For small data transmission in RRC_INACTIVE state, the network can provide pre-configured UL grant resources to inactive UEs with the UE context identifier (e.g., I-RNTI) and optional RAN notification area identifier (e.g., RNA ID). Two types of pre-configured grants are used for the inactive UE when the timing advance is valid.

For pre-configured grant type1 (hereinafter called PCG), it is pre-configured by RRC signaling (e.g., RRCRelease) per serving cell (i.e., cell-based) and per BWP when UE enters RRC_INACTIVE state. The inactive UE may be configured with multiple PCGs for a given activated BWP of a serving cell. When the inactive UE is stationary or stays in the serving cell, PCG is triggered by small UL data arrival to the inactive UE' transmission buffer and the transmission of PCG PUSCH resources is followed by RRC configuration. The following parameters, but not limited to, may be configured for pre-configured grant type1 (i.e., PCG):

I-RNTI: it is used to identify the UE context in RRC_INACTIVE

CS-RNTI: it is optional and may be used for re-transmission

Periodicity: it is the periodicity of PCG

Offset: it is the time domain offset of PCG resource startAlloction: it is the starting resource (e.g., (sub)frame number, symbol number) of PCG in time domain PCG transmission threshold: the allowed maximum data volume (e.g., 32 bytes) can be transmitted on the PCG resources when it is configured Activated BWP ID: The PCG resource is allocated on a configured activated BWP when entering RRC_INACTIVE state For pre-configured grant type2 (hereinafter called RNA-based PCG, RBPCG), it is pre-configured by RRC signaling (e.g., RRCRelease) per RNA in a default BWP when UE enters RRC_INACTIVE state. The inactive UE may be configured with multiple RBPCGs for a default BWP of an RNA. When the inactive UE leaves the coverage of the serving cell, RBPCG is triggered after RNA update. The RBPCG resource is configured for small UL data transmission within a RAN notification area in a default BWP for RRC_INACTIVE state. The transmission of RBPCG PUSCH resources is followed by RRC configuration and inter-node signaling. The following parameters, but not limited to, may be configured for pre-configured grant type2 (i.e., RBPCG):

I-RNTI: it is used to identify the UE context in RRC_INACTIVE

CS-RNTI: it is optional and may be used for re-transmission

Periodicity: it is the periodicity of PCG

Offset: it is the time domain offset of PCG resource startAlloction: it is the starting resource (e.g., (sub)frame number, symbol number) of PCG in time domain RBPCG transmission threshold: the allowed maximum data volume (e.g., 16, 256 bytes) can be transmitted on the RBPCG resources when it is configured RAN notification area related information: it may consist of cell ID list, RNA ID, and so on Default BWP ID: The RBPCG resource is allocated on a default BWP for RRC_INACTIVE state When the inactive UE decides to transmit UL small data on the RBPCG resource, it may switch to the default BWP and may transmit RAN notification area related information and/or UE context identifier combined with UL small data. Furthermore, the activated BWP ID used in PCG may be the same with the default BWP ID used in RBPCG, it depends on network configuration (e.g., BWP configuration).

Contention Free Random Access (CFRA): In contention-free Random Access, a Preamble is allocated by the gNB and such a preamble is known as dedicated random access preamble. The dedicated preamble may provide to UE via RRC signaling (allocating preamble can be configured within an RRC message). Therefore, the UE can transmit the dedicated preamble without contention.

Contention-based Random Access (CBRA): In contention-based Random Access, the UE selects a Preamble randomly from a preamble group shared with other UE. This means that the UE has a potential risk of selecting the same preamble as another UE and subsequently may experience collision. The gNB uses a contention resolution mechanism to handle the access requests. In this procedure, the result is random and not all Random Access succeeds.

The contention-free random access (CFRA) procedure in RRC_INACTIVE may be triggered by the following events:

The inactive UE is stationary or stays in the serving cell

The inactive UE leaves the coverage of the serving cell with seamless CFRA configuration CFRA resources are configured for the inactive UE Non-periodic and/or low latency UL small data transmission in RRC_INACTIVE Fail to transmit on configured grant (CG) resources The contention-based random access (CBRA) procedure in RRC_INACTIVE may be triggered by the following events:

The inactive UE leaves the coverage of the serving cell without any CFRA configuration CFRA resources are not configured for the inactive UE Non-periodic and/or low priority UL small data transmission in RRC_INACTIVE Fail to transmit on configured grant (CG) resources or to perform CFRA procedure In embodiments of the present disclosure, in contention-free Random Access (CFRA), the dedicated preamble(s) is pre-configured to the UE(s) or is configured by the gNB via RRC signaling for small data transmission in inactive state; in contention-based Random access, UE selects a preamble randomly from a preamble group associated with the small data transmission threshold for performing 2-step or 4-step RA-SDT. As to performing CFRA or CBRA, it depends on network configuration (e.g., PRACH configuration).

The Contention-based Random Access procedure can be a four-step (4-step) procedure or a two-step (2-step) procedure. For the 4-step procedure, the UE transmits a contention-based PRACH preamble, also known as MSG1. After detecting the preamble, the gNB responds with a random-access response (RAR), also known as MSG2. The RAR includes the detected preamble ID, a time-advance command, a temporary C-RNTI (TC-RNTI), and an uplink grant for scheduling a PUSCH transmission from the UE known as MSG3. In response to the RAR, the UE transmits MSG3 including an ID for contention resolution. Upon receiving MSG3, the network transmits a contention resolution message, also known as MSG4, with the contention resolution ID. The UE receives MSG4, and if the UE finds its contention-resolution ID it sends an acknowledgement on a PUCCH, which completes the 4-step random access procedure.

The 2-step procedure is to reduce latency and control-signaling overhead by having a single round trip cycle between the UE and the base station. This is achieved by combining the preamble (MSG1) and the scheduled PUSCH transmission (MSG3) into a single message (MSGA) from the UE to the gNB, known as MSGA and by combining the random-access respond (MSG2) and the contention resolution message (MSG4) into a single message (MSGB) from the gNB to UE. The 2-step procedure and the 4-step procedure can also be applied to Contention Free Random Access in the case that the dedicated preamble is provided to the UE.

In embodiments of the present disclosure, there are two types of RACH procedures in RRC_INACTIVE are supported: 2-step RA type and 4-step RA type. In 2-step RA type, at least one of a PRACH preamble group and a Resume ID are configured to the UE for small data transmission when entering RRC_INACTIVE state. In some cases, the dedicated PRACH preamble and PUSCH resource are contention-free for MSGA transmission. The MSGA of the 2-step RA type includes a configured preamble on PRACH and a payload on PUSCH. The minimum payload size of MSGA is assumed to be the same size as the MAC PDU for initial access, e.g., 56 bits or 72 bits based on the triggered condition. Contention resolution in 2-step RA type will be done by a UE context identifier in MSGA which is echoed in MSGB. In other words, for contention resolution in MSGB, the UE context identifier should be contained in MSGA. The UE context identifier is unique and may be implemented by e.g., I-RNTI, resume ID, S-TMSI, C-RNTI, RandomValue, SDT-RNTI. The network shall keep the I-RNTI or resume ID together with the UE context including the AS security context and bearer configuration while UE enters RRC_INACTIVE state. When the network receives the configured PRACH preamble combined with the UE context identifier from the inactive UE, it retrieves UE's context and UL date and then responds DL data in MSGB if necessary. MSGB may consist of response for RA response, contention resolution, fallback indication, DL data PDU, and so on. The inactive UE can keep in RRC_INACTIVE state, regardless of MSGA transmission (i.e., UE context identifier transmission), unless PUSCH transmission in MSGA is failure. The inactive UE may perform a fallback 4-step RA type in RRC_INACTIVE state or 4-step random access procedure for entering RRC_CONNECTED state once failed PUSCH transmission of MSGA in 2-step RA type.

In 4-step RA type, at least one of PRACH preamble group for MSG1 transmission is configured by the network. Here, the PRACH preamble group of 4-step RA type can be the same with that configured in 2-step RA type. In other words, the PRACH preamble would be selected from a PRACH preamble group no matter the RA type is. In some cases, a dedicated PRACH preamble is contention-free for MSG1 transmission. The inactive UE should monitor MSG2 for RA response from the network within a configured RA response window in RRC_INACTIVE state. When the RA response window is expired, the inactive UE shall retransmit the configured PRACH preamble until achieving the maximum number of PRACH transmission. The inactive UE transits to RRC_CONNECTED state upon the reception of RA response for normal UL date transmission procedure. In other words, if 4-step RA type is failed, the inactive UE shall perform 4-step random access procedure for entering RRC_CONNECTED state.

The dedicated PRACH preamble(s) used in MSGA of 2-step CFRA can be shared with MSG1 used in 4-step CFRA. It would be beneficial for performing CFRA fallback. In some cases, the network cannot configure the shared CFRA resources for 2-step and 4-step RA types at the same time within a Bandwidth Part (BWP). The inactive UE may transmit UL small data in RRC_INACTIVE by using 2-step or 4-step RA procedure when the network condition and the transmission threshold is allowed.

In embodiments of the present disclosure, for low latency small data transmission in RRC_INACTIVE state with mobility consideration, the inactive UE should notify the network to require the UL grant resource in advance without state transition. There are two schemes are provided for inactive UEs to activate the "inactive" UL grant resources when the inactive UE is moving out of the serving cell/RNA:

One-way indication scheme: In this scheme, the serving cell may negotiate with neighboring cells/RNAs about SDT configuration (e.g., PCG/RBPCG/RA resources, UE AS context, I-RNTI) when the inactive UE transits RRC_INACTIVE state. The inactive UE may transmit the indication through a notification message (e.g., the indication may be piggybacked in the proximity indication, RNA update, or some other new notification messages used in RRC_INACTIVE state) to the serving or target cell/RNA to activate the "inactive" UL grant resource when it moves across the boundary of the serving cell/RNA. For example, but no limit to, when the inactive UE detects the target cell ID located in the same RNA ID, it may transmit the proximity indication for obtaining the PCG configuration of the target cell. Otherwise, the inactive UE may transmit the RNA update for obtaining the PCG configuration of the target cell when detecting out of RNA coverage. Upon the reception of proximity indication, if the neighboring cells/RNAs can allocation the same time/frequency "inactive" UL grant resources, the serving cell/RNA may inform the candidate/target cell(s)/RNA(s) to activate the PCG/RBPCG/RA resources for seamless data transmission. On the other hand, the target cell may activate the PCG/RBPCG/RA resources upon the reception of proximity indication. If the neighboring cells/RNAs cannot allocation the same time/frequency UL grant resources as the serving cell/RNA, the serving cell/RNA may reply RRC signaling (e.g., paging) the inactive UE for specifying the neighboring cells'/RNAs' PCG/RBPCG/RA configurations. The network may perform RAN paging or CN paging, it depends on whether the target cell is in the same RNA. Furthermore, if the network can ensure the UE's location, the response signaling can be unicast to the inactive UE. Upon the reception of response signaling, the inactive UE can transmit the UL small data on the PCG/RBPCG/RA resources in the target cell/RNA without state transition.

Two-way request scheme: In this scheme, the PCG/RBPCG/RA configurations can be transmitted on RRC signaling (e.g., system information (SI), RRCRelease). The inactive UE can transmit the RRC request (e.g., on-demand system information request, RRC resume request) to the serving or target cell for acquiring the SDT configuration (e.g., PCG/RBPCG/RA configurations) in RRC_INACTIVE without state transition. Upon the reception of RRC request from the inactive UE, the serving or target cell unicasts/broadcasts the associated with SDT configurations and then activate the "inactive" UL grant resource. The transmission of RRC request can be forwarded before/when the inactive UE desires to launch low latency small data transmission in RRC_INACTIVE state. Furthermore, the RRC request transmission can be contention-based or contention-free, it may depend on physical random access channel (PRACH) configuration. With negotiation between serving cell and neighboring cells, the serving cell may reply RRC response with not only SDT configuration of serving cell but also neighboring cells'.

In embodiments of the present disclosure, regarding Multiple Radio (MR)-DC and New Radio (NR)-DC, if the network supports the dual connectivity (DC) configuration, the DC configuration is maintained in RRC_INACTIVE state in order to avoid unnecessary signaling overhead and resource consumption, and the inactive UE can transmit URLLC data to Master RAN node(s) and Secondary RAN node(s) on PCG/RBPCG/RA resources. When the inactive UE detects one of Secondary RAN node configurations is going to invalid due to mobility or bad channel conditions, it can apply the proposed one-way indication or two-way request scheme for requesting inactive DC reconfiguration and inactive UL grant reconfiguration. The inactive UE may transmit the indication or RRC request to the Master RAN node(s) for requesting inactive DC reconfiguration and inactive UL grant reconfiguration. Upon the reception of inactive DC reconfiguration and inactive UL grant reconfiguration request from the inactive UE, the network may apply the proposed one-way indication or two-way request scheme for switching Secondary RAN node(s) and PCG/RBPCG/RA configuration of Secondary RAN node(s).

In embodiments of the present disclosure, regarding low latency small data transmission in RRC_INACTIVE state over one or more non-Public networks (NPNs) with mobility consideration, the proposed one-way indication or two-way request scheme can be applied to NPN subscribers. The inactive NPN subscriber is able to restrict the mobility according to the allowed cell list. Therefore, the allowed NPN cell(s) listed in mobility restriction may configure PCG/RBPCG/RA resources when NPN subscriber enters RRC_INACTIVE state.

Therefore, some embodiments of the present disclosure propose an apparatus (such as a user equipment (UE) and/or a base station) and a method of wireless communication, which can solve issues in the prior art, improve issues of power consumption, signaling overhead and resource allocation, provide a good communication performance, and/or provide high reliability.

Figure 1B:
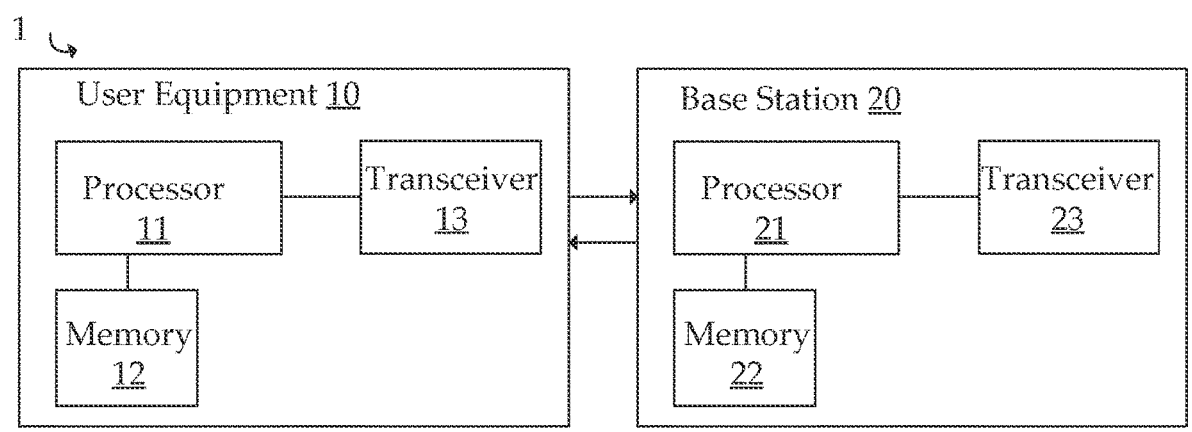
FIG. 1B is a block diagram of one or more user equipments (UEs) and a base station of wireless communication in a communication controlling system according to an embodiment of the present disclosure.

A schematic view and a functional block diagram of a communication controlling system 1 according to the present disclosure are shown in FIG. 1A and FIG. 1B respectively. The communication controlling system 1 includes a user equipment (UE) 10 and a base station 20. The user equipment 10 and the base station 20 may communicate with each other either wirelessly or in a wired way. The base station 20 and a next generation core network 30 may also communicate with each other either wirelessly or in a wired way. When the communication controlling system 1 complies with the New Radio (NR) standard of the 3rd Generation Partnership Project (3GPP), the next generation core network 30 is a backend serving network system and may include an Access and Mobility Management Function (AMF), a User Plane Function (UPF), and a Session Management Function (SMF). The user equipment 10 may be a non-NPN capable apparatus or a non-public network (NPN) capable apparatus, but the present disclosure is not limited to this.

In FIG. 1B, in some embodiments, one or more user equipments (UEs) 10 and the base station (e.g., gNB or eNB) 20 for wireless communication in the communication controlling system 1 according to an embodiment of the present disclosure are provided. The communication controlling system 1 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured with uplink (UL) grant resources for the UE to perform UL data transmission in an inactive state based on the configured UL grant resources; and is configured to perform the UL data transmission on the configured UL grant resources in the inactive state based on traffic characteristic of the UL data transmission and at least one transmission threshold. This can solve issues in the prior art, improve an issue of increasing in power consumption and signaling overhead, provide a good communication performance, and/or provide high reliability.

In some embodiments, the processor 21 configures a UE with uplink (UL) grant resources for the UE to perform UL data transmission in an inactive state based on the configured UL grant resources; and is configured to receive, from the UE, the UL data transmission performed on the configured UL grant resources in the inactive state based on traffic characteristic of the UL data transmission and at least one transmission threshold. This can solve issues in the prior art, improve an issue of increasing in power consumption and signaling overhead, provide a good communication performance, and/or provide high reliability.

Figure 1C:
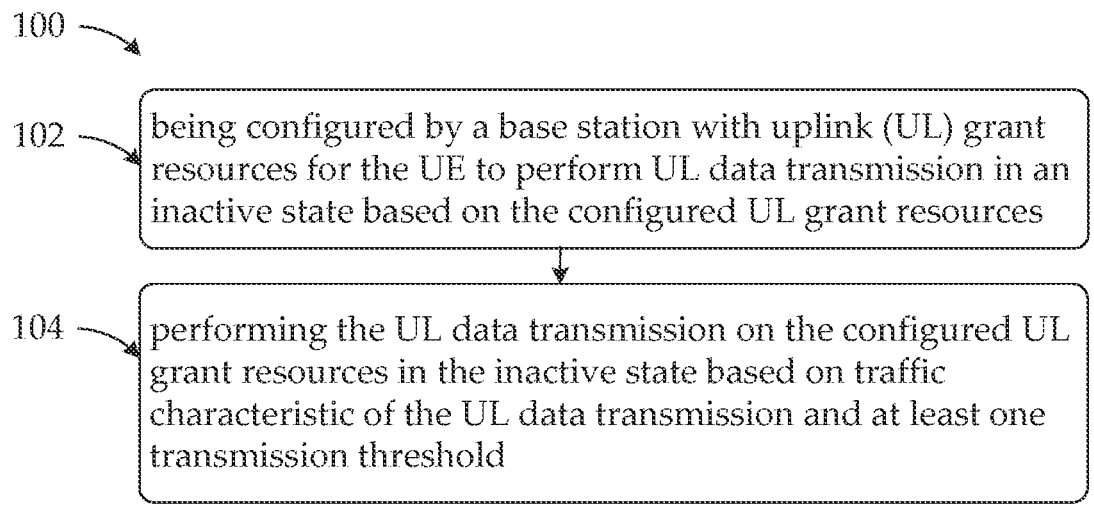
FIG. 1C is a flowchart illustrating a method of wireless communication performed by a user equipment (UE) according to an embodiment of the present disclosure.

FIG. 1C illustrates a method 100 of wireless communication by a user equipment (UE) according to an embodiment of the present disclosure. In some embodiments, the method 100 includes: a block 102, being configured by a base station with uplink (UL) grant resources for the UE to perform UL data transmission in an inactive state based on the configured UL grant resources; and a block 104, performing the UL data transmission on the configured UL grant resources in the inactive state based on traffic characteristic of the UL data transmission and at least one transmission threshold. This can solve issues in the prior art, improve an issue of increasing in power consumption and signaling overhead, provide a good communication performance, and/or provide high reliability.

Figure 1D:
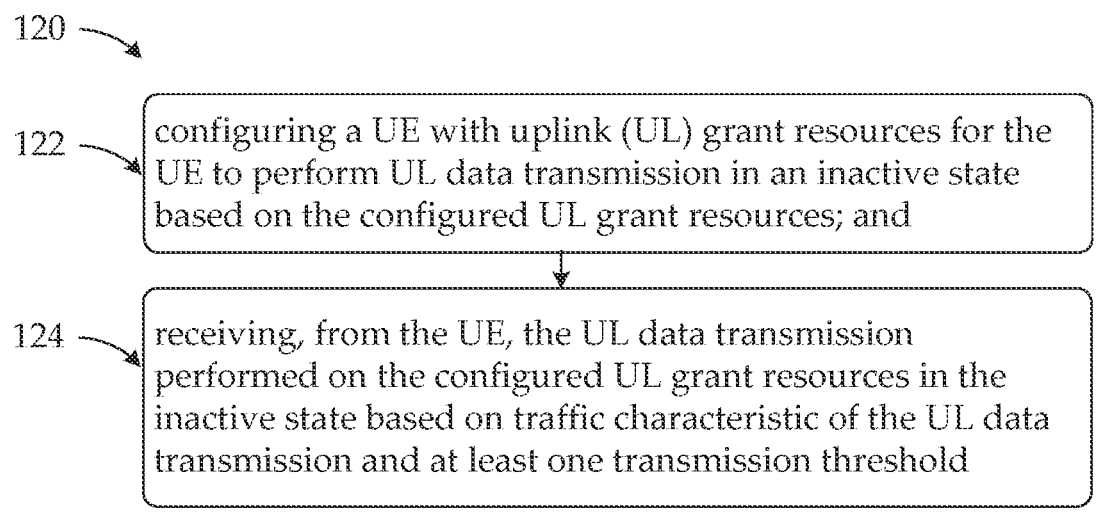
FIG. 1D is a flowchart illustrating a method of wireless communication performed by a base station according to an embodiment of the present disclosure.

FIG. 1D illustrates a method 120 of wireless communication by a base station according to an embodiment of the present disclosure. In some embodiments, the method 120 includes: a block 122, configuring a UE with uplink (UL) grant resources for the UE to perform UL data transmission in an inactive state based on the configured UL grant resources; and a block 124, receiving, from the UE, the UL data transmission performed on the configured UL grant resources in the inactive state based on traffic characteristic of the UL data transmission and at least one transmission threshold. This can solve issues in the prior art, improve an issue of increasing in power consumption and signaling overhead, provide a good communication performance, and/or provide high reliability.

In some embodiments, the inactive state is RRC_INACTIVE state, where RRC stands for Radio Resource Control. In some embodiments, the traffic characteristic includes at least one of priority, latency or periodicity, channel access priority class. In some embodiments, the transmission threshold includes a data volume threshold.

In some embodiments, the UL grant resources are cell-based pre-configured grant (PCG) resources for at least one of inactive UE. In some embodiments, the UL grant resources are pre-configured UL grant resources by RRC signaling per serving cell and per Bandwidth Part (BWP) when the UE enters the inactive state. In some embodiments, the UL grant resources are configured by at least one PCG configurations. In some embodiments, the UL grant resources are pre-configured by a UE context identifier. In some embodiments, the UE context identifier includes an Inactive-Radio Network Temporary Identifier (I-RNTI). In some embodiments, the PCG resources are used for the UE to perform the UL data transmission in the inactive state when the UE stays in a serving cell configuring the PCG resources. In some embodiments, the method further includes checking whether the UE stays in a same serving cell based on at least one of cell identifier or a received signal strength threshold. In some embodiments, responsive to checking whether the UE stays in the same serving cell based on the received signal strength threshold, the received signal strength threshold is a reference signal received power (RSRP) threshold. In some embodiments, the method further includes checking whether the UE stays in the same serving cell when the UE enters the inactive state with mobility consideration.

In some embodiments, the UL grant resources are RNA-based PCG (RBPCG) resources. In some embodiments, the UL grant resources are pre-configured UL grant resources by RRC signaling per RNA in a default Bandwidth Part (BWP) when the UE enters the inactive state. In some embodiments, the UL grant resources are configured by at least one RBPCG configurations. In some embodiments, the UL grant resources are pre-configured by at least one of a UE context identifier or a RAN notification area identifier. In some embodiments, the RAN notification area identifier includes an RNA ID. In some embodiments, the RBPCG resources are used for the UE in a RAN notification area to perform the UL data transmission in the inactive state when the UE leaves a coverage of a serving cell but still within the RAN notification area. In some embodiments, the method further includes checking whether the UE stays in a same Radio Access Network (RAN) Notification Area (RNA) based on at least one of RNA identifier or a received signal strength threshold. In some embodiments, responsive to checking whether the UE stays in the same RNA based on the received signal strength threshold, the received signal strength threshold is a reference signal received power (RSRP) threshold. In some embodiments, the method further includes checking whether the UE stays in the same RNA when the UE enters the inactive state with mobility consideration.

In some embodiments, the UL data transmission in the inactive state is random access (RA) based transmission with a contention-free random access (CFRA) procedure triggered by at least one of the following events: the UE in the inactive state is stationary or stays in a serving cell serving the UE; the UE in the inactive state leaves a coverage of the serving cell with seamless CFRA configuration; CFRA resources are configured for the UE in the inactive state; non-periodic and/or low latency UL data transmission in the inactive state; or fail to transmit on configured grant (CG) resources. In some embodiments, the UL data transmission in the inactive state is random access (RA) based transmission with a contention-based random access (CBRA) procedure triggered by at least one of the following events: the UE in the inactive state leaves a coverage of a serving cell serving the UE without any CFRA configuration; CFRA resources are not configured for the UE in the inactive state; non-periodic and/or low priority UL data transmission in the inactive state; or fail to transmit on configured grant (CG) resources or to perform a CFRA procedure.

In some embodiments, the UL data transmission in the inactive state is performed in a two-step (2-step) RA procedure. In some embodiments, the UL data transmission in the inactive state is carried by a MSGA of the 2-step RA procedure while a MSGB of the 2-step RA procedure carries a response from the base station. In some embodiments, the MSGA of the 2-step RA procedure includes a dedicated preamble on a physical random access channel (PRACH) and further includes a unique UE context identifier for contention resolution. In some embodiments, the UL grant resources are configured for MSGA transmission when the UE enters the inactive state.

In some embodiments, the method further includes performing a 2-step RA procedure for implementing the UL data transmission in the inactive state. In some embodiments, the method further includes responsive to a failure of the 2-step RA procedure, performing a four-step (4-step) RA procedure for implementing the UL data transmission. In some embodiments, in the 4-step RA procedure, the UL data transmission is implemented in the inactive state of the UE. In some embodiments, in the 4-step RA procedure, the UL data transmission is implemented in a connected state of the UE. In some embodiments, the connected state is an RRC_CONNECTED state. In some embodiments, the method further includes responsive to a failure of the 2-step RA procedure, performing a 4-step CFRA procedure for implementing the UL data transmission. In some embodiments, a dedicated PRACH preamble in the 2-step RA procedure is shared with the 4-step CFRA procedure. In some embodiments, the method further includes responsive to a failure of the 4-step CFRA procedure, performing a 4-step CBRA procedure for implementing the UL data transmission. In some embodiments, the method further includes responsive to a failure of the 2-step RA procedure, performing a 4-step CBRA procedure for implementing the UL data transmission.

In some embodiments, configuration of the UL grant resources is negotiated between a serving cell serving the UE and a target cell having a same RAN notification area (RNA) identifier with the serving cell, the method further includes transmitting a notification to the serving cell or the target cell to activate the configuration of the UL grant resources when the UE moves across a boundary of the serving cell; and performing the UL data transmission in the inactive state based on the configuration of the UL grant resources in the target cell. In some embodiments, the method further includes responsive to that the target cell allocates time/frequency UL grant resources as the same as the serving cell, performing seamless UL data transmission in the inactive state. In some embodiments, the method further includes responsive to that the target cell does not allocate time/frequency UL grant resources as the same as the serving cell, obtaining the configuration of the UL grant resources of the target cell by means of RAN paging. In some embodiments, the notification is piggybacked in proximity indication.

In some embodiments, configuration of the UL grant resources is negotiated between a serving RNA having a serving cell serving the UE and a target RNA having a target cell having a different RNA identifier from the serving cell, the method further includes transmitting a notification to the serving or target cell/RNA to activate the configuration of the UL grant resources when the UE moves across a boundary of the serving RNA; and performing the UL data transmission in the inactive state based on the configuration of the UL grant resources in the target cell of the target RNA. In some embodiments, the method further includes responsive to that the target cell allocates time/frequency UL grant resources as the same as the serving cell, performing seamless UL data transmission in the inactive state. In some embodiments, the method further includes responsive to that the target cell does not allocate time/frequency UL grant resources as the same as the serving cell, obtaining the configuration of the UL grant resources of the target cell by means of core network (CN) paging. In some embodiments, the notification is piggybacked in RNA update.

In some embodiments, the method further includes transmitting an RRC request in the inactive state to a serving cell serving the UE or a target cell the UE is to communicate with; and acquiring, from the serving cell or the target cell, configuration of the UL grant resources of the serving cell or the target cell in the inactive state without state transition. In some embodiments, the RRC request is an on-demand system information (SI) request. In some embodiments, the configuration of the UL grant resources is contention-free configuration of the UL grant resources. In some embodiments, the transmission of the RRC request is contention-based or contention-free. In some embodiments, configuration of the UL grant resources is negotiated between the serving cell and a neighboring cell of the UE.

In some embodiments, the UL data transmission on the UL grant resources in the inactive state is provided to both a Master RAN node and a Secondary RAN node based on dual connectivity (DC) configuration of the Master RAN node and the Secondary RAN node. In some embodiments, the method further includes transmitting a notification to the Master RAN node for requesting DC reconfiguration and UL grant reconfiguration; and performing the UL data transmission in the inactive state based on reconfigured DC configuration of the Master RAN node and a new Secondary RAN node and the UL grant resources of the new Secondary RAN node. In some embodiments, the method further includes transmitting an RRC request in the inactive state to the Master RAN node for requesting DC reconfiguration and UL grant reconfiguration; and acquiring, from the Master RAN node, reconfigured DC configuration of the Master RAN node and a new Secondary RAN node and the UL grant resources of the new Secondary RAN node in the inactive state without state transition. In some embodiments, the RRC request is an on-demand system information (SI) request.

In some embodiments, the UL data transmission on the UL grant resources in the inactive state is over one or more non-Public networks (NPNs). In some embodiments, the method further includes checking whether the UE stays in a same serving cell of the one or more NPNs based on at least one of cell identifier or a received signal strength threshold. In some embodiments, responsive to checking whether the UE stays in the same serving cell based on the cell identifier, the cell identifier is listed in an allowed cell list for a NPN subscriber. In some embodiments, responsive to checking whether the UE stays in the same serving cell based on the received signal strength threshold, the received signal strength threshold is a reference signal received power (RSRP) threshold. In some embodiments, the method further includes checking whether the UE stays in the same serving cell when the UE enters the inactive state with mobility consideration. In some embodiments, the method further includes transmitting a notification to the one or more NPNs to activate configuration of the UL grant resources of a NPN subscriber of the one or more NPNs; and performing the UL data transmission in the inactive state to the NPN subscriber based on the UL grant resources of the NPN subscriber. In some embodiments, the method further includes transmitting an RRC request in the inactive state to the one or more NPNs; and acquiring, from the one or more NPNs, configuration of the UL grant resources of a NPN subscriber of the one or more NPNs in the inactive state without state transition. In some embodiments, the RRC request is an on-demand system information (SI) request.

In some embodiments, the method further includes determining whether to perform the UL data transmission in the inactive state on PCG resources or 2-step RA resources based on the traffic characteristic. In some embodiments, the at least one transmission threshold includes a first transmission threshold and a second transmission threshold, the method including: determining whether to perform the UL data transmission in the inactive state on the PCG resources based on the first transmission threshold; and determining whether to perform the UL data transmission in the inactive state on the 2-step RA resources based on the second transmission threshold. In some embodiments, the method further includes responsive to a failure of the UL data transmission on the PCG resources but the UL data transmission being under the second transmission threshold, performing the UL data transmission in the inactive state on the 2-step RA resources. In some embodiments, the method further includes responsive to the UL data transmission exceeding the first transmission threshold or the second transmission threshold, performing the UL data transmission in a 4-step RA procedure. In some embodiments, in the 4-step RA procedure, the UE enters a connected state for performing the UL data transmission. In some embodiments, the method further includes responsive to a failure of the UL data transmission on the PCG resources or the 2-step RA resources, performing the UL data transmission in a 4-step RA procedure. In some embodiments, in the 4-step RA procedure, the UE enters a connected state for performing the UL data transmission. In some embodiments, the method further includes determining whether to perform the UL data transmission in the inactive state on RBPCG resources or 2-step RA resources based on the traffic characteristic. In some embodiments, the at least one transmission threshold includes a first transmission threshold and a second transmission threshold, the method including: determining whether to perform the UL data transmission in the inactive state on the RBPCG resources based on the first transmission threshold; and determining whether to perform the UL data transmission in the inactive state on the 2-step RA resources based on the second transmission threshold.

Figure 2A:
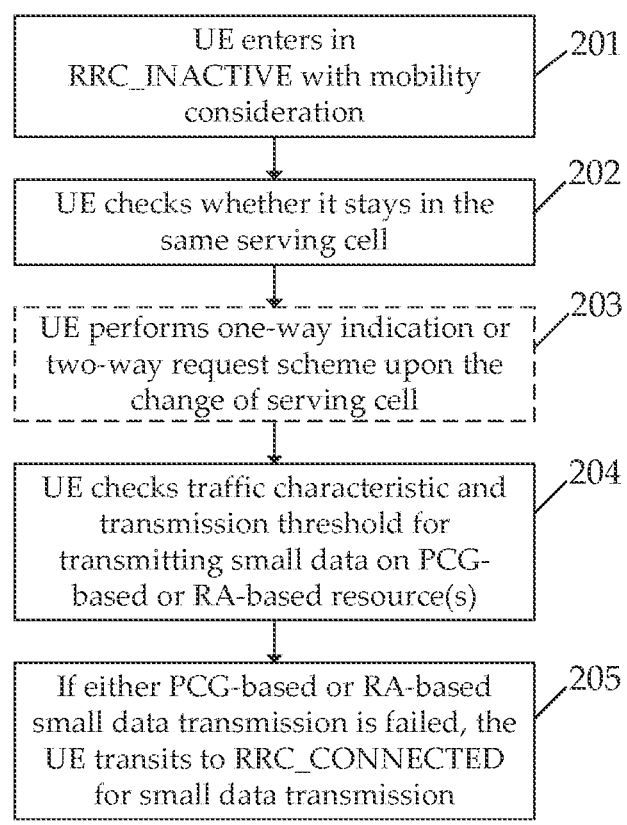
FIG. 2A is a flowchart of cell-based small data transmission for a UE in inactive state according to an embodiment of the present disclosure.
Figure 2B:
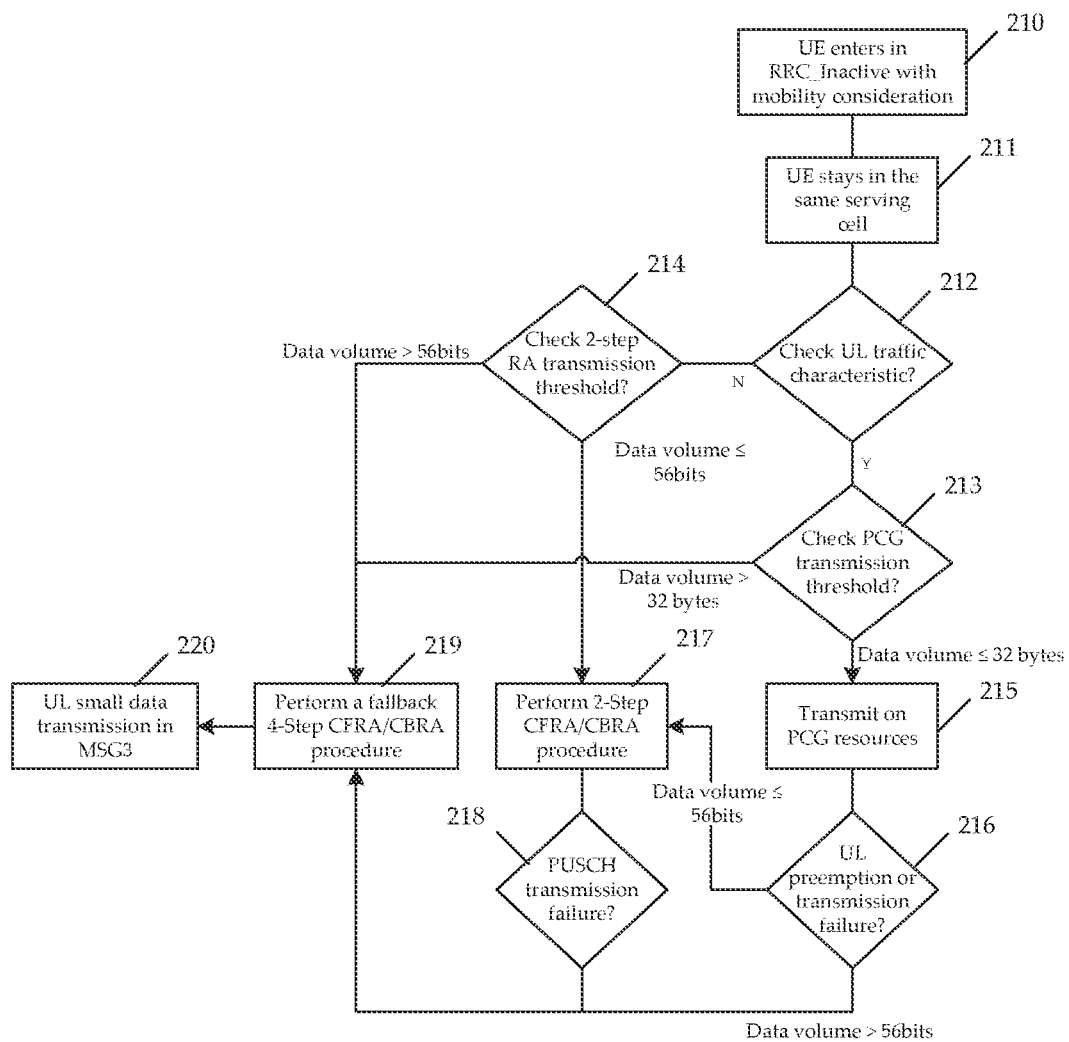
FIG. 2B is an exemplary flowchart of FIG. 2A.

A first embodiment of the present disclosure is as shown in FIGS. 2A and 2B, which depict implementation scenarios of signal transmission between the UE 10 and the base station 20 according to the present disclosure. More specifically, FIG. 2A illustrates cell-based small data transmission for a UE in RRC_INACTIVE state according to an embodiment of the present disclosure, and FIG. 2B illustrates an example of cell-based small data transmission for a UE in RRC_INACTIVE state according to the embodiment of the present disclosure. The network supports PCG and RA types small data transmission in RRC_INACTIVE. Both PCG transmission threshold and RA transmission threshold can be configured to the same or different. Here, for example but not limited to, the PCG transmission threshold and 2-step RA transmission threshold are assumed to be 32 bytes and 56 bits respectively. At block 201 (and 210), the inactive UE checks (e.g., by monitoring cell identifier(s), RSRP threshold) whether it stays in the same serving cell when entering RRC_INACTIVE state with mobility consideration. At block 202 (and 211), when the inactive UE stays in the same serving cell, and if there is UL data arrival to the UE's transmit buffer, the inactive UE checks the traffic characteristic (e.g., high priority, low latency, periodic, non-periodic, the table of channel access priority classes, access class) at block 204 (and 212) to determine whether to perform transmission on 2-step RA or PCG resource. For example, but not limited to, if the UL data is periodic and under the PCG transmission threshold (e.g., the UL data volume is smaller than 32 bytes), the PCG procedure can be adopted for UL data transmission at blocks 213 and 215. In some cases, when transmission on PCG is failed due to UL preemption and the UL data is under 2-step RA transmission threshold (e.g., the UL data volume is also smaller than 56 bits) at block 216, the inactive UE may perform 2-step CFRA/CBRA procedure for UL data transmission at block 217. Otherwise (at block 218), the inactive UE may perform 4-step CFRA/CBRA for UL small data transmission in MSG3 at blocks 219 and 220. On the other hand, if the UL data is non-infrequent and under 2-step RA transmission threshold (e.g., the UL data volume is also smaller than 56 bits), the inactive UE may perform 2-step CFRA/CBRA procedure for UL data transmission at block 214. Otherwise, the inactive UE may perform 4-step CFRA/CBRA for UL small data transmission in MSG3 at blocks 219 and 220. As to performing CFRA or CBRA, it depends on network configuration (e.g., PRACH configuration). The inactive UE is configured to perform the UL data transmission based on the above determinations. The PCG and RA resource can be configured when UE entering RRC_INACTIVE state. In some cases, the inactive UE may perform one-way indication or two-way request scheme to activate the "inactive" UL grant resources upon the change of serving cell at block 203.

In some cases, the inactive UE transits to RRC_CONNECTED state upon the reception of RA response for UL date transmission. If 4-step CFRA procedure is failed, the inactive UE shall perform 4-step CBRA procedure for entering RRC_CONNECTED state at block 205. The transmission threshold may include, but is not limited to, a data volume threshold. In some cases, gNB may configure PCG, 2-step RA, and 4-step RA resources with different transmission thresholds. In some cases, gNB may configure PCG, 2-step RA, and 4-step RA resources with a same transmission threshold. The transmission threshold is for determining PCG first, and then 2-step RA then 4-step RA. In some cases, gNB may configure PCG and any of 2-step RA and 4-step RA resources with different transmission thresholds. In some cases, gNB may configure PCG and any of 2-step RA and 4-step RA resources with a same transmission threshold. The transmission threshold is for determining PCG first, and then RA. In some cases, gNB may configure 2-step RA and 4-step RA resources with different transmission threshold. In some cases, gNB may configure 2-step RA and 4-step RA resources with a same transmission threshold. The transmission threshold is for determining 2-step RA first, then 4-step RA. In some cases, gNB may configure PCG resources; if meet the threshold, transmit data in inactive state. In some cases, gNB may configure 2-step RA resources; if meet the threshold, transmit data in inactive state. In some cases, gNB may configure 4-step RA resources; if meet the threshold, transmit data in inactive state.

Figure 3A:
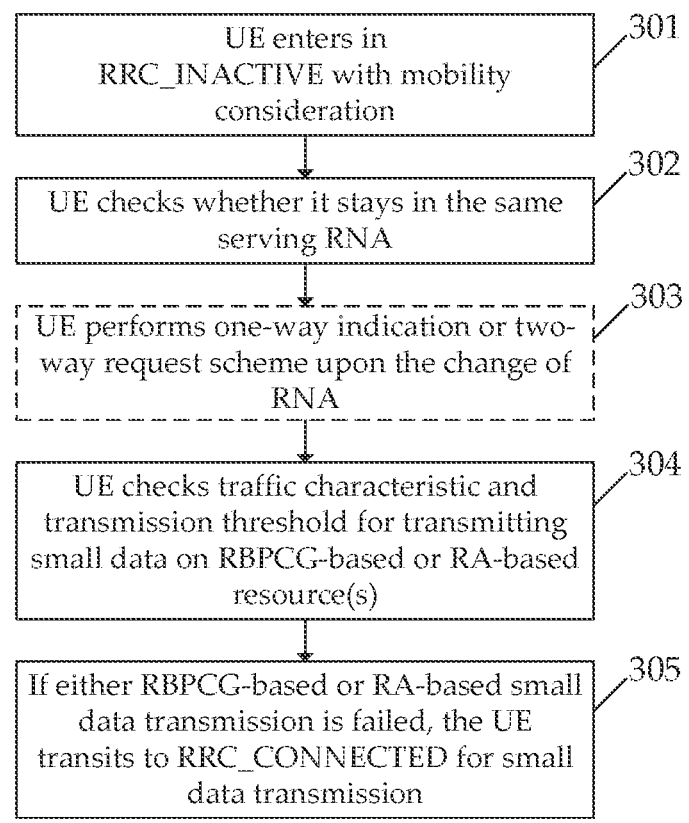
FIG. 3A is a flowchart of RNA-based small data transmission for a UE in inactive state according to an embodiment of the present disclosure.
Figure 3B:
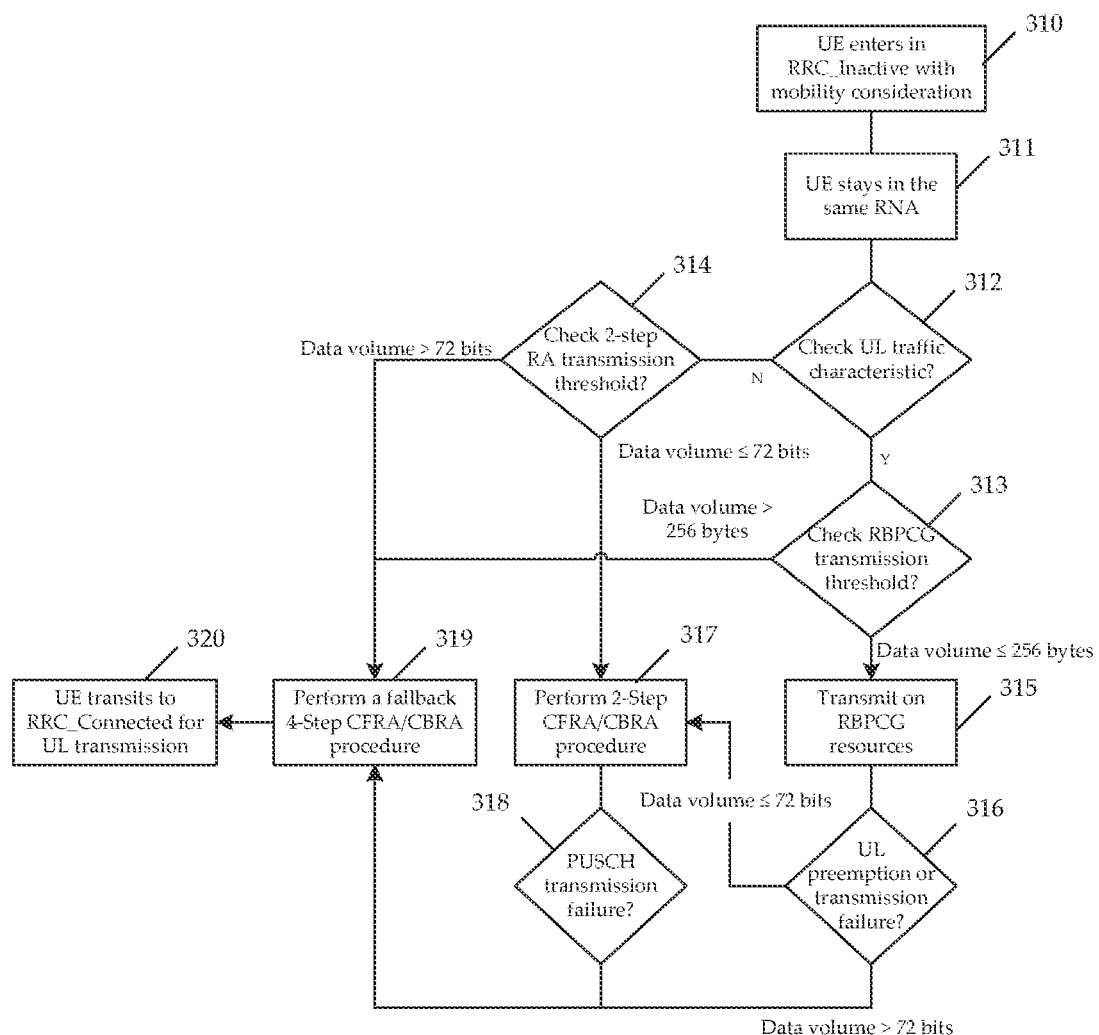
FIG. 3B is an exemplary flowchart of FIG. 3A.

A second embodiment of the present disclosure is as shown in FIGS. 3A and 3B, which depict implementation scenarios of signal transmission between the UE 10 and the base station 20 according to the present disclosure. More specifically, FIG. 3A illustrates RNA-based small data transmission for a UE in RRC_INACTIVE state according to an embodiment of the present disclosure, and FIG. 3B illustrates an example of RNA-based small data transmission for a UE in RRC_INACTIVE state according to the embodiment of the present disclosure. The network supports RBPCG and RA types small data transmission in RRC_INACTIVE. Both RBPCG transmission threshold and RA transmission threshold can be configured to the same or different. Here, for example but not limited to, the RBPCG transmission threshold and 2-step RA transmission threshold are assumed to be 256 bytes and 72 bits respectively. At block 301 (and 301), the inactive UE switches to the default BWP and checks (e.g., by monitoring RNA identifier(s), RSRP threshold) whether it stays in the same RNA after entering RRC_INACTIVE state with mobility consideration. At block 302 (and 311) When the inactive UE stays in the same serving RNA, and if there is UL data arrival to the UE's transmit buffer, the inactive UE checks the traffic characteristic (e.g., high priority, low latency, periodic, non-periodic, the table of channel access priority classes, access class) at to block 304 (and 312) determine whether to perform transmission on 2-step RA or RBPCG resource. For example, but not limited to, if the UL data is periodic and under the RBPCG transmission threshold (e.g., the UL data volume is smaller than 256 bytes), the RBPCG procedure can be adopted for UL data transmission at blocks 313 and 315. In some cases, when transmission on RBPCG is failed due to UL preemption and the UL data is under 2-step RA transmission threshold (e.g., the UL data volume is also smaller than 72 bits) at block 316, the inactive UE may perform 2-step CFRA/CBRA procedure for UL data transmission at block 317. Otherwise (at block 318), the inactive UE may perform 4-step CFRA/CBRA for UL small data transmission in MSG3 at blocks 319 and 320. On the other hand, if the UL data is non-infrequent and under 2-step RA transmission threshold (e.g., the UL data volume is also smaller than 72 bits), the inactive UE may perform 2-step CFRA/CBRA procedure for UL data transmission at block 314. Otherwise, the inactive UE may perform 4-step CFRA/CBRA for UL small data transmission in MSG3 at blocks 319 and 320. As to performing CFRA or CBRA, it depends on network configuration (e.g., PRACH configuration). The inactive UE is configured to perform the UL data transmission based on the above determinations. The RBPCG and RA resource can be configured when UE entering RRC_INACTIVE state. In some cases, the inactive UE may perform one-way indication or two-way request scheme to activate the "inactive" UL grant resources upon the change of RNA at block 303.

In some cases, the inactive UE transits to RRC_CONNECTED state upon the reception of RA response for UL date transmission. If 4-step CFRA procedure is failed, the inactive UE shall perform 4-step CBRA procedure for entering RRC_CONNECTED state. The transmission threshold may include, but is not limited to, a data volume threshold. In some cases, gNB may configure RBPCG, 2-step RA, and 4-step RA resources with different transmission thresholds. In some cases, gNB may configure RBPCG, 2-step RA, and 4-step RA resources with a same transmission threshold. The transmission threshold is for determining RBPCG first, and then 2-step RA then 4-step RA. In some cases, gNB may configure RBPCG and any of 2-step RA and 4-step RA resources with different transmission thresholds. In some cases, gNB may configure RBPCG and any of 2-step RA and 4-step RA resources with a same transmission threshold. The transmission threshold is for determining RBPCG first, and then RA. In some cases, gNB may configure 2-step RA and 4-step RA resources with different transmission threshold. In some cases, gNB may configure 2-step RA and 4-step RA resources with a same transmission threshold. The transmission threshold is for determining 2-step RA first, then 4-step RA. In some cases, gNB may configure RBPCG resources; if meet the threshold, transmit data in inactive state. In some cases, gNB may configure 2-step RA resources; if meet the threshold, transmit data in inactive state. In some cases, gNB may configure 4-step RA resources; if meet the threshold, transmit data in inactive state.

Figure 4:
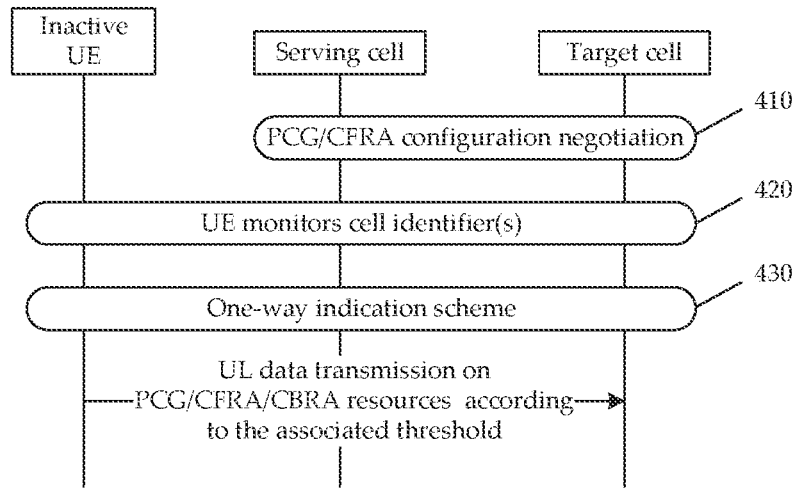
FIG. 4 is a flowchart of cell-based one-way indication scheme according to an embodiment of the present disclosure.

A third embodiment of the present disclosure is as shown in FIG. 4, which depicts implementation scenarios of signal transmission between the UE 10 and the base station 20 according to the present disclosure. Specifically, FIG. 4 illustrates cell-based one-way indication scheme for a UE in RRC_INACTIVE state according to an embodiment of the present disclosure. The network supports PCG and RA types small data transmission in RRC_INACTIVE. Both PCG transmission threshold and RA transmission threshold can be configured to the same or different for performing data transmission via PCG or RA type. Here, for example but not limited to, the PCG transmission threshold and 2-step RA transmission threshold are assumed to be 32 bytes and 56 bits respectively. The inactive UE checks (e.g., by monitoring cell identifier(s), RSRP threshold) whether it stays in the same serving cell when entering RRC_INACTIVE state with mobility consideration at block 420. When the UE enters RRC_INACTIVE state or detects the cell ID(s) is different from the serving cell ID, it may perform one-way indication scheme at block 430 before/after moving in the target cell. If there is UL data arrival to the UE's transmit buffer, the inactive UE checks the traffic characteristic (e.g., high priority, low latency, periodic, non-periodic, the table of channel access priority classes, access class) to determine whether to perform transmission on 2-step RA or PCG resource. For example, if the UL data is periodic and under the PCG transmission threshold (e.g., the UL data volume is smaller than 32 bytes), the PCG procedure can be adopted for UL data transmission. In some cases, when transmission on PCG is failed due to UL preemption and the UL data is under 2-step RA transmission threshold (e.g., the UL data volume is also smaller than 56 bits), the inactive UE may perform 2-step CFRA/CBRA procedure for UL data transmission. Otherwise, the inactive UE may perform 4-step CFRA/CBRA for UL small data transmission in MSG3. On the other hand, if the UL data is non-infrequent and under 2-step RA transmission threshold (e.g., the UL data volume is also smaller than 56 bits), the inactive UE may perform 2-step CFRA/CBRA procedure for UL data transmission. Otherwise, the inactive UE may perform 4-step CFRA/CBRA for UL small data transmission in MSG3. As to performing CFRA or CBRA, it depends on network configuration (e.g., PRACH configuration). The inactive UE is configured to perform the UL data transmission based on the above determinations. The PCG and RA resource can be configured when UE entering RRC_INACTIVE state. In this embodiment, the inactive UE performs one-way indication scheme to activate the "inactive" UL grant resources of the target cell. Serving cell and candidate/target cell(s) should negotiate the PCG/CFRA configuration at block 410 before the reception of one-way indication.

Figure 5:
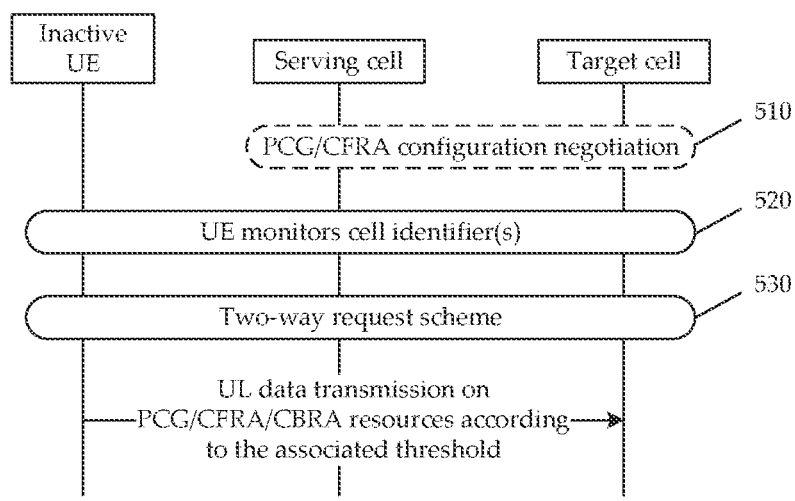
FIG. 5 is a flowchart of cell-based two-way request scheme according to an embodiment of the present disclosure.

A fourth embodiment of the present disclosure is as shown in FIG. 5, which depicts implementation scenarios of signal transmission between the UE 10 and the base station 20 according to the present disclosure. Specifically, FIG. 5 illustrates cell-based two-way request scheme for a UE in RRC_INACTIVE state according to an embodiment of the present disclosure. The network supports PCG and RA types small data transmission in RRC_INACTIVE. Both PCG transmission threshold and RA transmission threshold can be configured to the same or different. Here, for example but not limited to, the PCG transmission threshold and 2-step RA transmission threshold are assumed to be 32 bytes and 56 bits respectively. The inactive UE checks (e.g., by monitoring cell identifier(s), RSRP threshold) whether it stays in the same serving cell when entering RRC_INACTIVE state with mobility consideration at block 520. When the inactive UE needs to obtain PCG/RA configurations of serving cell and/or target cell, it may perform two-way request scheme with the associated cell at block 530. If there is UL data arrival to the UE's transmit buffer, the inactive UE checks the traffic characteristic (e.g., high priority, low latency, periodic, non-periodic, the table of channel access priority classes, access class) to determine whether to perform transmission on 2-step RA or PCG resource. For example, if the UL data is periodic and under the PCG transmission threshold (e.g., the UL data volume is smaller than 32 bytes), the PCG procedure can be adopted for UL data transmission. In some cases, when transmission on PCG is failed due to UL preemption and the UL data is under 2-step RA transmission threshold (e.g., the UL data volume is also smaller than 56 bits), the inactive UE may perform 2-step CFRA/CBRA procedure for UL data transmission. Otherwise, the inactive UE may perform 4-step CFRA/CBRA for UL small data transmission in MSG3. On the other hand, if the UL data is non-infrequent and under 2-step RA transmission threshold (e.g., the UL data volume is also smaller than 56 bits), the inactive UE may perform 2-step CFRA/CBRA procedure for UL data transmission. Otherwise, the inactive UE may perform 4-step CFRA/CBRA for UL small data transmission in MSG3. As to performing CFRA or CBRA, it depends on network configuration (e.g., PRACH configuration). The inactive UE is configured to perform the UL data transmission based on the above determinations. The PCG and RA resource can be configured when UE entering RRC_INACTIVE state or the reception of RRC request. In this embodiment, the inactive UE performs two-way request scheme to obtain PCG and RA configurations of the target cell. Serving cell and candidate/target cell(s) can optionally negotiate the PCG/RA configuration at block 510 before the reception of RRC request.

Figure 6:
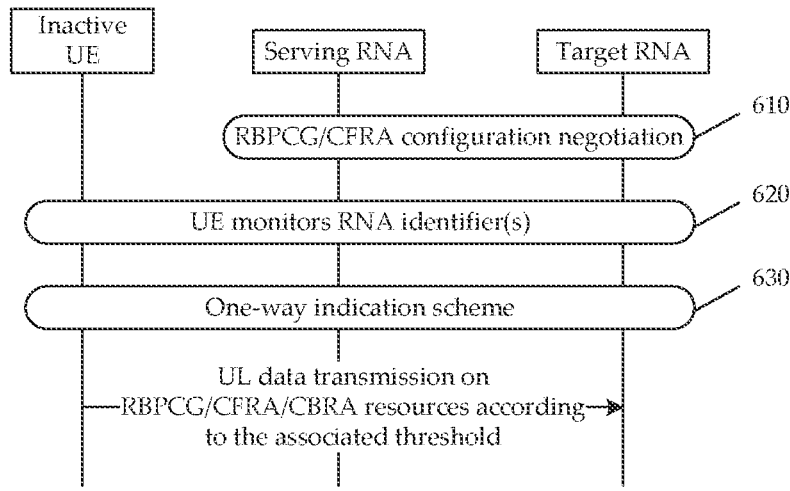
FIG. 6 is a flowchart of RNA-based one-way indication scheme according to an embodiment of the present disclosure.

A fifth embodiment of the present disclosure is as shown in FIG. 6, which depicts implementation scenarios of signal transmission between the UE 10 and the base station 20 according to the present disclosure. Specifically, FIG. 6 illustrates RNA-based one-way indication scheme for a UE in RRC_INACTIVE state according to an embodiment of the present disclosure. The network supports RBPCG and RA types small data transmission in RRC_INACTIVE. Both RBPCG transmission threshold and RA transmission threshold can be configured to the same or different. Here, for example but not limited to, the RBPCG transmission threshold and 2-step RA transmission threshold are assumed to be 256 bytes and 72 bits respectively. The inactive UE checks (e.g., by monitoring RNA identifier(s), RSRP threshold) whether it stays in the same serving RNA when entering RRC_INACTIVE state with mobility consideration at block 620. When the UE enters RRC_INACTIVE state or detects the candidate/target RNA ID(s) is different from the serving RNA ID, it may perform one-way indication scheme at block 630 before moving in the target RNA. If there is UL data arrival to the UE's transmit buffer, the inactive UE checks the traffic characteristic (e.g., high priority, low latency, periodic, non-periodic, the table of channel access priority classes, access class) to determine whether to perform transmission on 2-step RA or RBPCG resource. For example, if the UL data is periodic and under the RBPCG transmission threshold (e.g., the UL data volume is smaller than 256 bytes), the RBPCG procedure can be adopted for UL data transmission. In some cases, when transmission on RBPCG is failed due to UL preemption and the UL data is under 2-step RA transmission threshold (e.g., the UL data volume is also smaller than 72 bits), the inactive UE may perform 2-step CFRA/CBRA procedure for UL data transmission. Otherwise, the inactive UE may perform 4-step CFRA/CBRA for UL small data transmission in MSG3. On the other hand, if the UL data is non-infrequent and under 2-step RA transmission threshold (e.g., the UL data volume is also smaller than 72 bits), the inactive UE may perform 2-step CFRA/CBRA procedure for UL data transmission. Otherwise, the inactive UE may perform 4-step CFRA/CBRA for UL small data transmission in MSG3. As to performing CFRA or CBRA, it depends on network configuration (e.g., PRACH configuration). The inactive UE is configured to perform the UL data transmission based on the above determinations. The RBPCG and RA resource can be configured when UE entering RRC_INACTIVE state. In this embodiment, the inactive UE performs one-way indication scheme to activate the "inactive" UL grant resources of the target RNA. Serving RNA and candidate/target RNA(s) should negotiate the RBPCG/CFRA configuration at block 610 before the reception of one-way indication.

Figure 7:
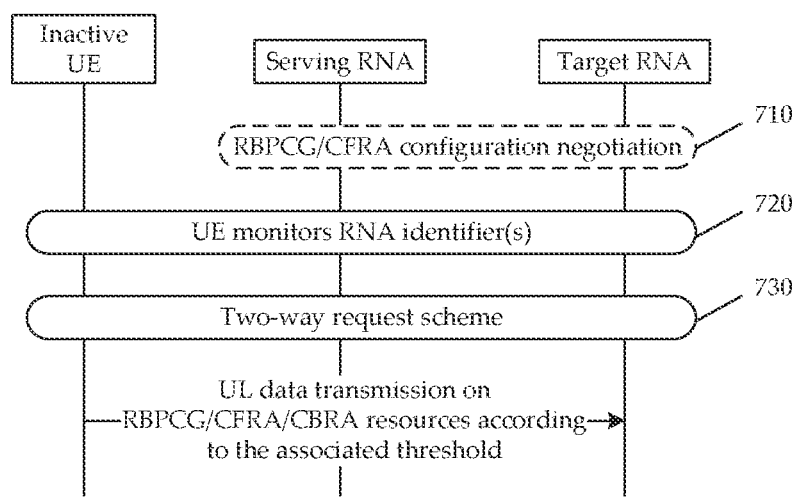
FIG. 7 is a flowchart of RNA-based two-way request scheme according to an embodiment of the present disclosure.

A sixth embodiment of the present disclosure is as shown in FIG. 7, which depicts implementation scenarios of signal transmission between the UE 10 and the base station 20 according to the present disclosure. Specifically, FIG. 7 illustrates RNA-based two-way request scheme for a UE in RRC_INACTIVE state according to an embodiment of the present disclosure. The network supports RBPCG and RA types small data transmission in RRC_INACTIVE. Both RBPCG transmission threshold and RA transmission threshold can be configured to the same or different. Here, for example but not limited to, the RBPCG transmission threshold and 2-step RA transmission threshold are assumed to be 256 bytes and 72 bits respectively. The inactive UE checks (e.g., by monitoring RNA identifier(s), RSRP threshold) whether it stays in the same serving RNA when entering RRC_INACTIVE state with mobility consideration at block 720. When the inactive UE needs to obtain RBPCG/RA configurations of serving RNA and/or target RNA, it may perform two-way request scheme with the camped cell of associated RNA at block 730. If there is UL data arrival to the UE's transmit buffer, the inactive UE checks the traffic characteristic (e.g., high priority, low latency, periodic, non-periodic, the table of channel access priority classes, access class) to determine whether to perform transmission on 2-step RA or RBPCG resource. For example, if the UL data is periodic and under the RBPCG transmission threshold (e.g., the UL data volume is smaller than 256 bytes), the RBPCG procedure can be adopted for UL data transmission. In some cases, when transmission on RBPCG is failed due to UL preemption and the UL data is under 2-step RA transmission threshold (e.g., the UL data volume is also smaller than 72 bits), the inactive UE may perform 2-step CFRA/CBRA procedure for UL data transmission. Otherwise, the inactive UE may perform 4-step CFRA/CBRA for UL small data transmission in MSG3. On the other hand, if the UL data is non-infrequent and under 2-step RA transmission threshold (e.g., the UL data volume is also smaller than 72 bits), the inactive UE may perform 2-step CFRA/CBRA procedure for UL data transmission. Otherwise, the inactive UE may perform 4-step CFRA/CBRA for UL small data transmission in MSG3. As to performing CFRA or CBRA, it depends on network configuration (e.g., PRACH configuration). The inactive UE is configured to perform the UL data transmission based on the above determinations. The RBPCG and RA resource can be configured when UE entering RRC_INACTIVE state or the reception of RRC request. In this embodiment, the inactive UE performs two-way request scheme to obtain RBPCG and CFRA configurations of the target cell. Serving RNA and candidate/target RNA(s) can optionally negotiate the RBPCG/RA configuration at block 710 before the reception of RRC request.

Figure 8:
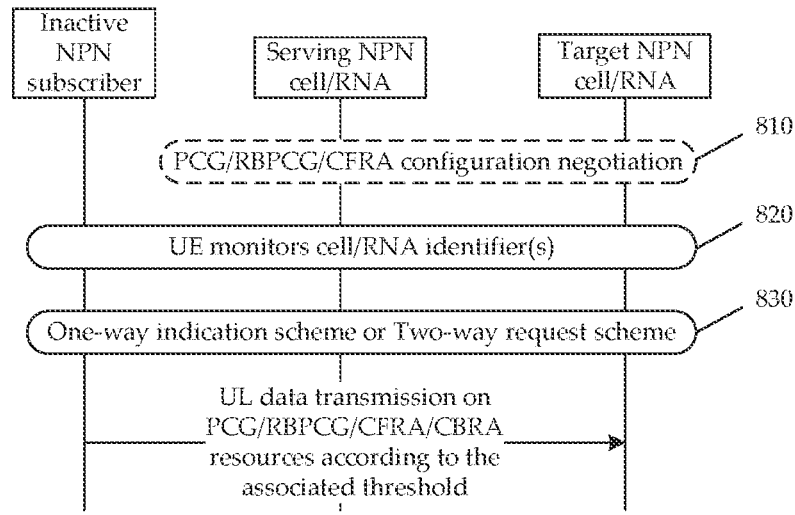
FIG. 8 is a flowchart of small data transmission in inactive state for NPN applications according to an embodiment of the present disclosure.

A seventh embodiment of the present disclosure is as shown in FIG. 8, which depicts implementation scenarios of signal transmission between the UE 10 and the base station 20 according to the present disclosure. Specifically, FIG. 8 illustrates small data transmission for a UE in RRC_INACTIVE state for NPN applications according to an embodiment of the present disclosure. A Non-Public network (also called a private network) is a physical or virtual cellular system that has been deployed for private use by subscribers. Non-Public Network (NPN) is the term used by 3GPP for such networks. An NPN is a 5GS and is deployed as two following types:

- a Standalone Non-Public Network (SNPN): operated by an NPN operator and not relying on network functions provided by a PLMN. The combination of a PLMN ID and Network identifier (NID) identifies an SNPN. Optionally a human-readable network name (HRNN) per NID can be used for manual NPN selection.
- a Public Network Integrated Non-Public Network (PNI-NPN): integrated with the support of a PLMN. The combination of a PLMN ID and Closed Access Group identifier (CAG ID) identifies an PNI-NPN. Optionally a human-readable network name (HRNN) per CAG ID can be used for manual NPN selection.

Regarding low latency small data transmission in RRC_INACTIVE state over non-Public networks (NPN) with mobility consideration, the proposed one-way indication or two-way request scheme can be applied to NPN subscribers. The inactive NPN subscriber is able to restrict the mobility according to the allowed cell/RNA list. Therefore, the allowed NPN cell(s) listed in mobility restriction may configure PCG/RBPCG/RA resources for the inactive NPN subscriber. The inactive NPN subscriber checks (e.g., by monitoring NPN cell/RNA identifier(s), it may include PLMN ID, NID, CAG ID, HRNN, and so on, or, RSRP threshold) whether it stays in the same serving cell/RNA at block 820 when entering RRC_INACTIVE state with mobility consideration. When the inactive NPN subscriber detects the NPN cell/RNA ID(s) is different from the serving cell/RNA ID, it may perform one-way indication scheme or two-way request scheme at block 830 before/after moving in the target cell/RNA for activating the inactive UL grant resources. If there is UL data arrival to the NPN subscriber's transmit buffer, the inactive NPN subscriber checks the traffic characteristic (e.g., high priority, low latency, periodic, non-periodic, the table of channel access priority classes, access class) to determine whether to perform transmission on 2-step RA or PCG/RBPCG resource. For example, if the UL data is periodic and under the PCG/RBPCG transmission threshold, the PCG/RBPCG procedure can be adopted for UL data transmission. In some cases, when transmission on PCG/RBPCG is failed due to UL preemption and the UL data is under 2-step RA transmission threshold, the inactive NPN subscriber may perform 2-step CFRA/CBRA procedure for UL data transmission. Otherwise, the inactive NPN subscriber may perform 4-step CFRA/CBRA for UL small data transmission in MSG3. On the other hand, if the UL data is non-infrequent and under 2-step RA transmission threshold, the inactive NPN subscriber may perform 2-step CFRA/CBRA procedure for UL data transmission. Otherwise, the inactive NPN subscriber may perform 4-step CFRA/CBRA for UL small data transmission in MSG3. As to performing CFRA or CBRA, it depends on network configuration (e.g., PRACH configuration). The inactive NPN subscriber is configured to perform the UL data transmission based on the above determinations. PCG/RBPCG/RA configuration negotiation may be performed between NPN cells/RNAs at block 810.

Figure 9:
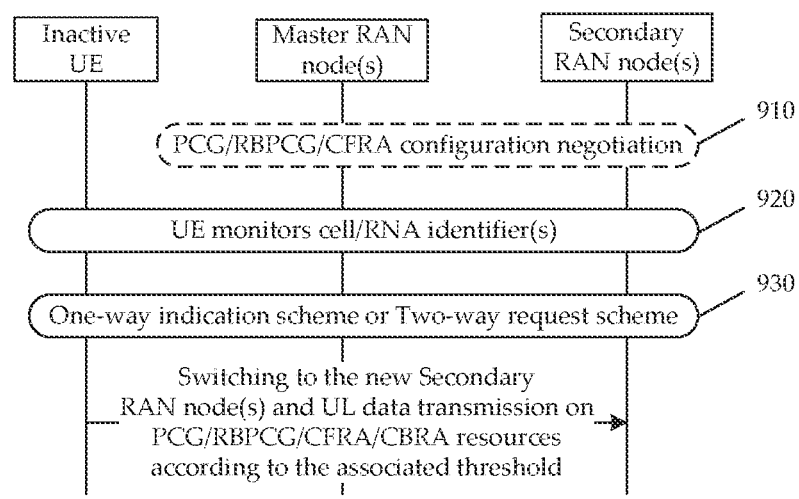
FIG. 9 is a flowchart of small data transmission in inactive state for applications supporting DC according to an embodiment of the present disclosure.

An eighth embodiment of the present disclosure is as shown in FIG. 9, which depicts implementation scenarios of signal transmission between the UE 10 and the base station 20 according to the present disclosure. Specifically, FIG. 9 illustrates small data transmission for a UE in RRC_INACTIVE state for applications supporting DC according to an embodiment of the present disclosure. Regarding MR-DC and NR-DC, if the network supports the at least dual connectivity (DC) configuration is maintained in RRC_INACTIVE state in order to avoid unnecessary signaling overhead and resource consumption, the inactive UE can transmit URLLC data to Master RAN node(s) and Secondary RAN node(s) on PCG/RBPCG/CFRA/CBRA resources. When the inactive UE detects one of Secondary RAN node configurations is going to invalid due to mobility or channel conditions (e.g., out of secondary RAN node's coverage, RNA coverage, RSRP threshold) at block 920, it can apply the proposed one-way indication or two-way request scheme at block 930 for requesting inactive DC reconfiguration and inactive UL grant reconfiguration. The inactive UE may transmit the indication or on-demand SI request to the Master RAN node(s) for requesting inactive DC reconfiguration and inactive UL grant reconfiguration. Upon the reception of inactive DC reconfiguration and inactive UL grant reconfiguration request from the inactive UE, the network may apply the proposed one-way indication or two-way request scheme for switching Secondary RAN node(s) and PCG/RBPCG/RA configuration of Secondary RAN node(s). PCG/RBPCG/RA configuration negotiation may be performed between Master RAN node(s) and Secondary RAN node(s) at block 810.

Commercial interests for some embodiments are as follows. 1. Solving issues in the prior art. 2. Improving an issue of increasing in power consumption and signaling overhead. 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 10:
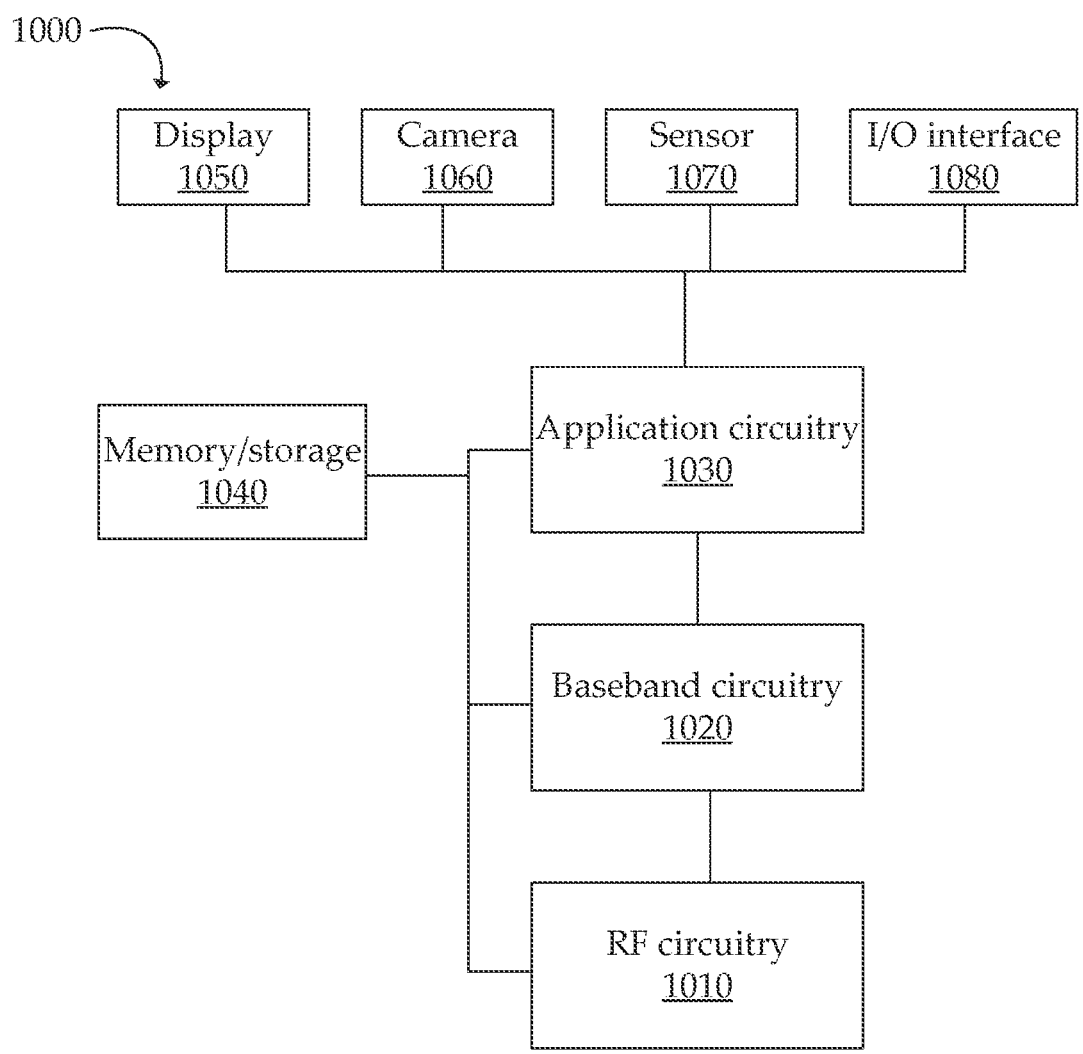
FIG. 10 is a block diagram of a system for wireless communication according to an embodiment of the present disclosure.

FIG. 10 is a block diagram of an example system 1000 for wireless communication according to an embodiment of the present disclosure. Embodiments described herein may be implemented into the system using any suitably configured hardware and/or software. FIG. 10 illustrates the system 1000 including a radio frequency (RF) circuitry 1010, a baseband circuitry 1020, an application circuitry 1030, a memory/storage 1040, a display 1050, a camera 1060, a sensor 1070, and an input/output (I/O) interface 1080, coupled with each other at least as illustrated. The application circuitry 1030 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 1020 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 1020 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 1010 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 1010 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 1040 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 1080 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 1070 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 1050 may include a display, such as a liquid crystal display and a touch screen display. In various embodiments, the system 1000 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
  receiving configuration of uplink (UL) grant resources from a base station, in which the configuration of UL grant resources is carried by RRC signaling;
  being configured by the base station with the UL grant resources for the UE to perform UL data transmission in an inactive state based on the configured UL grant resources, in which the UL grant resources is based on the configuration of UL grant resources; and
  when timing advance is valid, performing the UL data transmission on the configured UL grant resources in the inactive state based on traffic characteristic of the UL data transmission and at least one transmission threshold, wherein the traffic characteristic comprises at least one of priority, latency or periodicity, channel access priority class, or access class, and wherein the transmission threshold comprises a data volume threshold; and
  checking whether the UE stays in a same serving cell based on at least one of cell identifier or a received signal strength threshold when the UE enters the inactive state with mobility consideration.

2. The method of claim 1, wherein the UL grant resources are cell-based pre-configured grant (PCG) resources, and wherein the UL grant resources are pre-configured UL grant resources by RRC signaling per serving cell and per Bandwidth Part (BWP) when the UE enters the inactive state.

3. The method of claim 1, wherein the UL grant resources are radio access network (RAN) Notification Area-based (RNA-based) PCG (RBPCG) resources, and wherein the UL grant resources are pre-configured UL grant resources by RRC signaling per RNA in a default Bandwidth Part (BWP) when the UE enters the inactive state.

4. The method of claim 3, wherein the RBPCG resources are used for the UE in a RAN notification area to perform the UL data transmission in the inactive state when the UE leaves a coverage of a serving cell but still within the RAN notification area.

5. The method of claim 1, wherein the UE selects a preamble randomly from a preamble group associated with the transmission threshold for small data transmission for performing 2-step or 4-step RA-SDT.

6. The method of claim 1, further comprising:
performing a 2-step RA procedure for implementing the UL data transmission in the inactive state; and
responsive to a failure of the 2-step RA procedure, performing a four-step (4-step) RA procedure for implementing the UL data transmission, wherein in the 4-step RA procedure, the UL data transmission is implemented in the inactive state of the UE or the UL data transmission is implemented in a connected state of the UE.

7. The method of claim 1, further comprising:
performing a 2-step RA procedure for implementing the UL data transmission in the inactive state;
responsive to a failure of the 2-step RA procedure, performing a 4-step RA procedure for implementing the UL data transmission, wherein one or more physical random access channel (PRACH) preambles in the 2-step RA procedure are shared with the 4-step RA procedure; and
responsive to a failure of the 4-step RA procedure, performing a 4-step random access procedure for entering into a connected state to implement the UL data transmission.

8. The method of claim 1, wherein the configuration of the UL grant resources is negotiated between a serving cell serving the UE and a target cell having a same RAN notification area (RNA) identifier with the serving cell, the method further comprises:
transmitting a notification to the serving cell or the target cell to activate the configuration of the UL grant resources when the UE moves across a boundary of the serving cell; and
performing the UL data transmission in the inactive state based on the configuration of the UL grant resources in the target cell,
wherein the method further comprises:
responsive to that the target cell allocates time/frequency UL grant resources as the same as the serving cell, performing seamless UL data transmission in the inactive state; or
responsive to that the target cell and the serving cell cannot allocate the same time/frequency UL grant resources, obtaining the configuration of the UL grant resources of the target cell by means of RAN paging.

9. The method of claim 1, wherein the configuration of the UL grant resources is negotiated between a serving RNA having a serving cell serving the UE and a target RNA having a target cell having a different RNA identifier from the serving cell, the method further comprises:
transmitting a notification to the serving or target cell/ RNA to activate the configuration of the UL grant resources when the UE moves across a boundary of the serving RNA; and
performing the UL data transmission in the inactive state based on the configuration of the UL grant resources in the target cell of the target RNA,
wherein the method further comprises:
responsive to that the target cell allocates time/frequency UL grant resources as the same as the serving cell, performing seamless UL data transmission in the inactive state; or
responsive to that the target cell and the serving cell cannot allocate the same time/frequency UL grant resources, obtaining the configuration of the UL grant resources of the target cell by means of core network (CN) paging.

10. The method of claim 1, further comprising:
transmitting an RRC request in the inactive state to a serving cell serving the UE or a target cell the UE is to communicate with; and
acquiring, from the serving cell or the target cell, the configuration of the UL grant resources of the serving cell or the target cell in the inactive state without state transition,
wherein the configuration of the UL grant resources is contention-free configuration of the UL grant resources.

11. The method of claim 1, wherein the UL data transmission on the UL grant resources in the inactive state is provided to both a Master RAN node and a Secondary RAN node based on dual connectivity (DC) configuration of the Master RAN node and the Secondary RAN node.

12. The method of claim 11, further comprising:
transmitting a notification to the Master RAN node for requesting DC reconfiguration and UL grant reconfiguration; and
performing the UL data transmission in the inactive state based on reconfigured DC configuration of the Master RAN node and a new Secondary RAN node and the UL grant resources of the new Secondary RAN node,
or the method further comprising:
transmitting an RRC request in the inactive state to the Master RAN node for requesting the DC reconfiguration and the UL grant reconfiguration; and
acquiring, from the Master RAN node, the reconfigured DC configuration of the Master RAN node and the new Secondary RAN node and the UL grant resources of the new Secondary RAN node in the inactive state without state transition.

13. The method of claim 1, wherein the UL data transmission on the UL grant resources in the inactive state is over one or more non-Public networks (NPNs).

14. The method of claim 13, further comprising:
transmitting a notification to the one or more NPNs to activate the configuration of the UL grant resources of a NPN subscriber of the one or more NPNs; and
performing the UL data transmission in the inactive state based on the UL grant resources of the NPN subscriber,
or the method further comprising:
transmitting an RRC request in the inactive state to the one or more NPNs; and
acquiring, from the one or more NPNs, the configuration of the UL grant resources of the NPN subscriber of the one or more NPNs in the inactive state without state transition.

15. The method of claim 1, wherein responsive to checking whether the UE stays in the same serving cell based on the received signal strength threshold, the received signal strength threshold is a reference signal received power (RSRP) threshold.

16. The method of claim 1, wherein the at least one transmission threshold comprises a first transmission threshold and a second transmission threshold, the method comprising:
determining whether to perform the UL data transmission in the inactive state on the PCG resources based on the first transmission threshold;
determining whether to perform the UL data transmission in the inactive state on the 2-step RA resources based on the second transmission threshold;
responsive to a failure of the UL data transmission on the PCG resources but the UL data transmission being under the second transmission threshold, performing the UL data transmission in the inactive state on the 2-step RA resources; and
responsive to the UL data transmission exceeding the first transmission threshold or the second transmission threshold, performing the UL data transmission in a 4-step RA procedure.

17. The method of claim 1, further comprising:
responsive to a failure of the UL data transmission on the PCG resources or the 2-step RA resources, performing the UL data transmission in a 4-step RA procedure, wherein in the 4-step RA procedure, the UE enters a connected state for performing the UL data transmission.

18. The method of claim 1, further comprising:
checking whether the UE stays in a same radio access network (RAN) Notification Area (RNA) based on at least one of RNA identifier or the received signal strength threshold when the UE enters the inactive state with mobility consideration.

19. The method of claim 18, wherein responsive to checking whether the UE stays in the same RNA based on the received signal strength threshold, the received signal strength threshold is a reference signal received power (RSRP) threshold.

20. The method of claim 1, wherein the UL data transmission in the inactive state is random access (RA) based transmission with a contention-based random access (CBRA) procedure triggered by at least one of the following events:
the UE in the inactive state leaves a coverage of a serving cell serving the UE without any contention-free random access (CFRA) configuration;
CFRA resources are not configured for the UE in the inactive state;
non-periodic and/or low priority UL data transmission in the inactive state; or
fail to transmit on configured grant (CG) resources or to perform a CFRA procedure.

21. A user equipment (UE), comprising a memory, a transceiver and a processor coupled to the memory and the transceiver, the processor configured to call and run program instructions stored in a memory, to execute claim 1 of the wireless communication method.

22. A wireless communication method by a base station, comprising:
transmitting configuration of uplink (UL) grant resources to a user equipment (UE), in which the configuration of UL grant resources is carried by RRC signaling;
based on the configuration of UL grant resources, configuring the UE with the UL grant resources for the UE to perform UL data transmission in an inactive state;
receiving, from the UE, the UL data transmission performed on the configured UL grant resources in the inactive state based on traffic characteristic of the UL data transmission and at least one transmission threshold when timing advance is valid, wherein the traffic characteristic comprises at least one of priority, latency or periodicity, channel access priority class, or access class, and wherein the transmission threshold comprises a data volume threshold; and
allowing the UE to check whether the UE stays in a same serving cell based on at least one of cell identifier or a received signal strength threshold when the UE enters the inactive state with mobility consideration.

23. The method of claim 22, wherein the UL grant resources are cell-based pre-configured grant (PCG) resources, and wherein the UL grant resources are pre-configured UL grant resources by RRC signaling per serving cell and per Bandwidth Part (BWP) when the UE enters the inactive state.

24. The method of claim 22, wherein the UL grant resources are radio access network (RAN) Notification Area-based (RNA-based) PCG (RBPCG) resources, and wherein the UL grant resources are pre-configured UL grant resources by RRC signaling per RNA in a default Bandwidth Part (BWP) when the UE enters the inactive state.

25. The method of claim 24, wherein the RBPCG resources are used for the UE in a RAN notification area to perform the UL data transmission in the inactive state when the UE leaves a coverage of a serving cell but still within the RAN notification area.

26. The method of claim 22, wherein the base station allows the UE to select a preamble randomly from a preamble group associated with the transmission threshold for small data transmission for performing 2-step or 4-step RA-SDT.

27. The method of claim 22, further comprising:
allowing the UE to perform a 2-step RA procedure for implementing the UL data transmission in the inactive state; and
responsive to a failure of the 2-step RA procedure, allowing the UE to perform a four-step (4-step) RA procedure for implementing the UL data transmission, wherein in the 4-step RA procedure, the UL data transmission is implemented in the inactive state of the UE or the UL data transmission is implemented in a connected state of the UE.

28. The method of claim 22, further comprising:
allowing the UE to perform a 2-step RA procedure for implementing the UL data transmission in the inactive state;
responsive to a failure of the 2-step RA procedure, allowing the UE to perform a 4-step RA procedure for implementing the UL data transmission, wherein one or more physical random access channel (PRACH) preambles in the 2-step RA procedure are shared with the 4-step RA procedure; and
responsive to a failure of the 4-step RA procedure, allowing the UE to perform a 4-step random access procedure for entering into a connected state to implement the UL data transmission.

29. The method of claim 22, wherein the configuration of the UL grant resources is negotiated between a serving cell serving the UE and a target cell having a same RAN notification area (RNA) identifier with the serving cell, the method further comprises:
 allowing the UE to transmit a notification to the serving cell or the target cell to activate the configuration of the UL grant resources when the UE moves across a boundary of the serving cell; and
 allowing the UE to perform the UL data transmission in the inactive state based on the configuration of the UL grant resources in the target cell,
 wherein the method further comprises:
 responsive to that the target cell allocates time/frequency UL grant resources as the same as the serving cell, allowing the UE to perform seamless UL data transmission in the inactive state; or
 responsive to that the target cell and the serving cell cannot allocate the same time/frequency UL grant resources, allowing the UE to obtain the configuration of the UL grant resources of the target cell by means of RAN paging.

30. The method of claim 22, wherein the configuration of the UL grant resources is negotiated between a serving RNA having a serving cell serving the UE and a target RNA having a target cell having a different RNA identifier from the serving cell, the method further comprises:
 allowing the UE to transmit a notification to the serving or target cell/RNA to activate the configuration of the UL grant resources when the UE moves across a boundary of the serving RNA; and
 allowing the UE to perform the UL data transmission in the inactive state based on the configuration of the UL grant resources in the target cell of the target RNA,
 wherein the method further comprises:
 responsive to that the target cell allocates time/frequency UL grant resources as the same as the serving cell, allowing the UE to perform seamless UL data transmission in the inactive state; or
 responsive to that the target cell and the serving cell cannot allocate the same time/frequency UL grant resources, allowing the UE to obtain the configuration of the UL grant resources of the target cell by means of core network (CN) paging.

31. The method of claim 22, further comprising:
 allowing the UE to transmit an RRC request in the inactive state to a serving cell serving the UE or a target cell the UE is to communicate with; and
 allowing the UE to acquire, from the serving cell or the target cell, the configuration of the UL grant resources of the serving cell or the target cell in the inactive state without state transition,
 wherein the configuration of the UL grant resources is contention-free configuration of the UL grant resources.

32. The method of claim 22, wherein the UL data transmission on the UL grant resources in the inactive state is allowed to be provided to both a Master RAN node and a Secondary RAN node based on dual connectivity (DC) configuration of the Master RAN node and the Secondary RAN node.

33. The method of claim 32, further comprising:
 allowing the UE to transmit a notification to the Master RAN node for requesting DC reconfiguration and UL grant reconfiguration; and
 allowing the UE to perform the UL data transmission in the inactive state based on reconfigured DC configuration of the Master RAN node and a new Secondary RAN node and the UL grant resources of the new Secondary RAN node,
 or the method further comprising:
 allowing the UE to transmit an RRC request in the inactive state to the Master RAN node for requesting the DC reconfiguration and the UL grant reconfiguration; and
 allowing the UE to acquire, from the Master RAN node, the reconfigured DC configuration of the Master RAN node and the new Secondary RAN node and the UL grant resources of the new Secondary RAN node in the inactive state without state transition.

34. The method of claim 22, wherein the UL data transmission on the UL grant resources in the inactive state is over one or more non-Public networks (NPNs).

35. The method of claim 34, further comprising:
 allowing the UE to transmit a notification to the one or more NPNs to activate the configuration of the UL grant resources of a NPN subscriber of the one or more NPNs; and
 allowing the UE to perform the UL data transmission in the inactive state based on the UL grant resources of the NPN subscriber,
 or the method further comprising:
 allowing the UE to transmit an RRC request in the inactive state to the one or more NPNs; and
 allowing the UE to acquire, from the one or more NPNs, the configuration of the UL grant resources of the NPN subscriber of the one or more NPNs in the inactive state without state transition.

36. The method of claim 22, wherein the at least one transmission threshold comprises a first transmission threshold and a second transmission threshold, the method comprising:
 allowing the UE to determine whether to perform the UL data transmission in the inactive state on the PCG resources based on the first transmission threshold;
 allowing the UE to determine whether to perform the UL data transmission in the inactive state on the 2-step RA resources based on the second transmission threshold;
 responsive to a failure of the UL data transmission on the PCG resources but the UL data transmission being under the second transmission threshold, allowing the UE to perform the UL data transmission in the inactive state on the 2-step RA resources; and
 responsive to the UL data transmission exceeding the first transmission threshold or the second transmission threshold, allowing the UE to perform the UL data transmission in a 4-step RA procedure.

37. The method of claim 22, further comprising:
 responsive to a failure of the UL data transmission on the PCG resources or the 2-step RA resources, allowing the UE to perform the UL data transmission in a 4-step RA procedure, wherein in the 4-step RA procedure, the UE enters a connected state for performing the UL data transmission.

38. The method of claim 22, further comprising:
 allowing the UE to check whether the UE stays in a same radio access network (RAN) Notification Area (RNA) based on at least one of RNA identifier or the received signal strength threshold when the UE enters the inactive state with mobility consideration.

39. The method of claim 38, wherein responsive to checking whether the UE stays in the same RNA based on the received signal strength threshold, the received signal strength threshold is a reference signal received power (RSRP) threshold.

40. A base station (BS), comprising a memory, a transceiver and a processor coupled to the memory and the transceiver, the processor configured to call and run program instructions stored in a memory, to execute claim 22 of the wireless communication method.

\* \* \* \* \*